Oct. 19, 1954    O. CESAREO ET AL    2,692,082
AUTOMATIC CALCULATOR
Filed Dec. 17, 1946    11 Sheets—Sheet 3
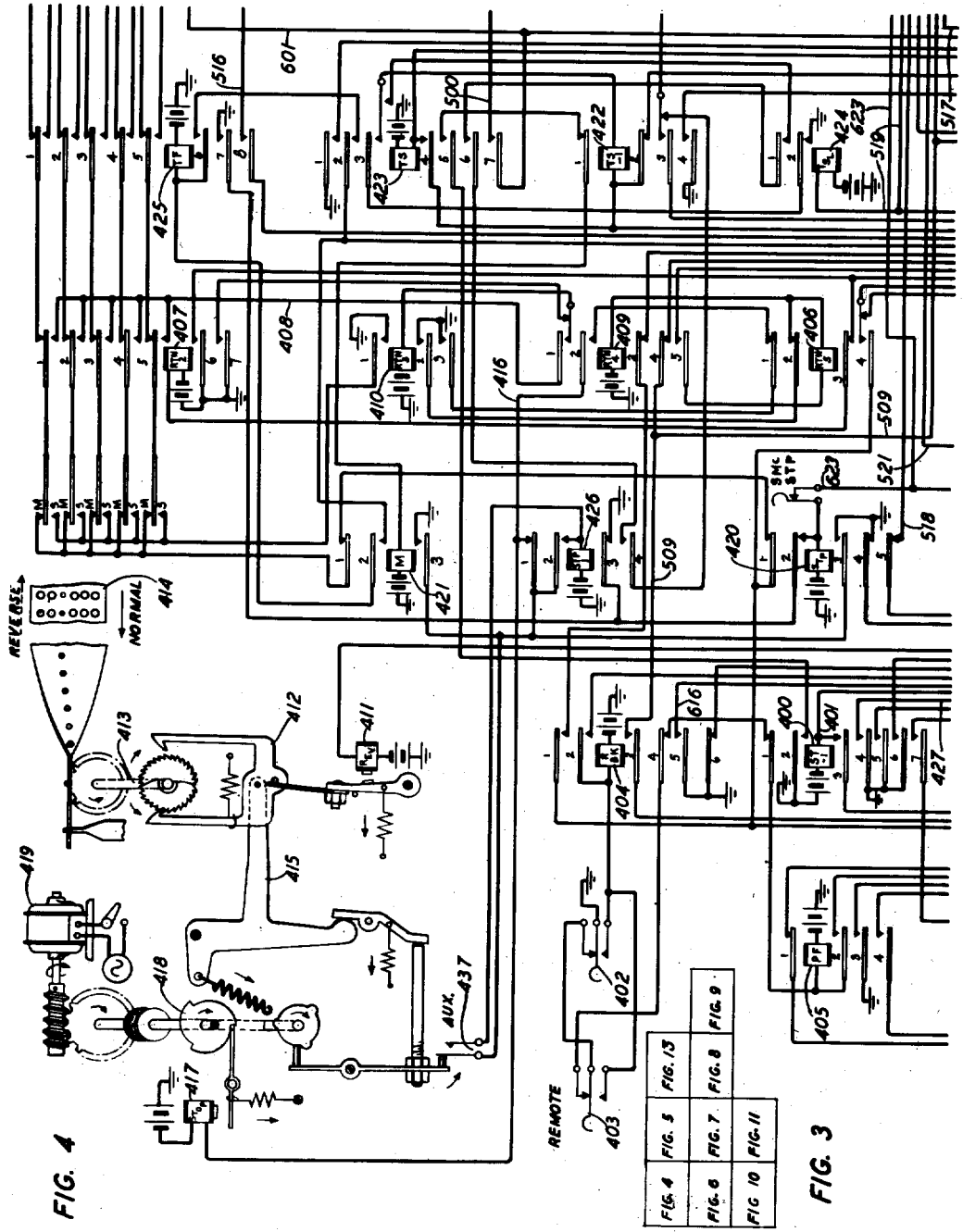
INVENTORS  O. CESAREO
W. B. STRICKLER
BY
ATTORNEY Oct. 19, 1954
O. CESAREO ET AL
2,692,082
AUTOMATIC CALCULATOR
Filed Dec. 17, 1946
11 Sheets—Sheet 4
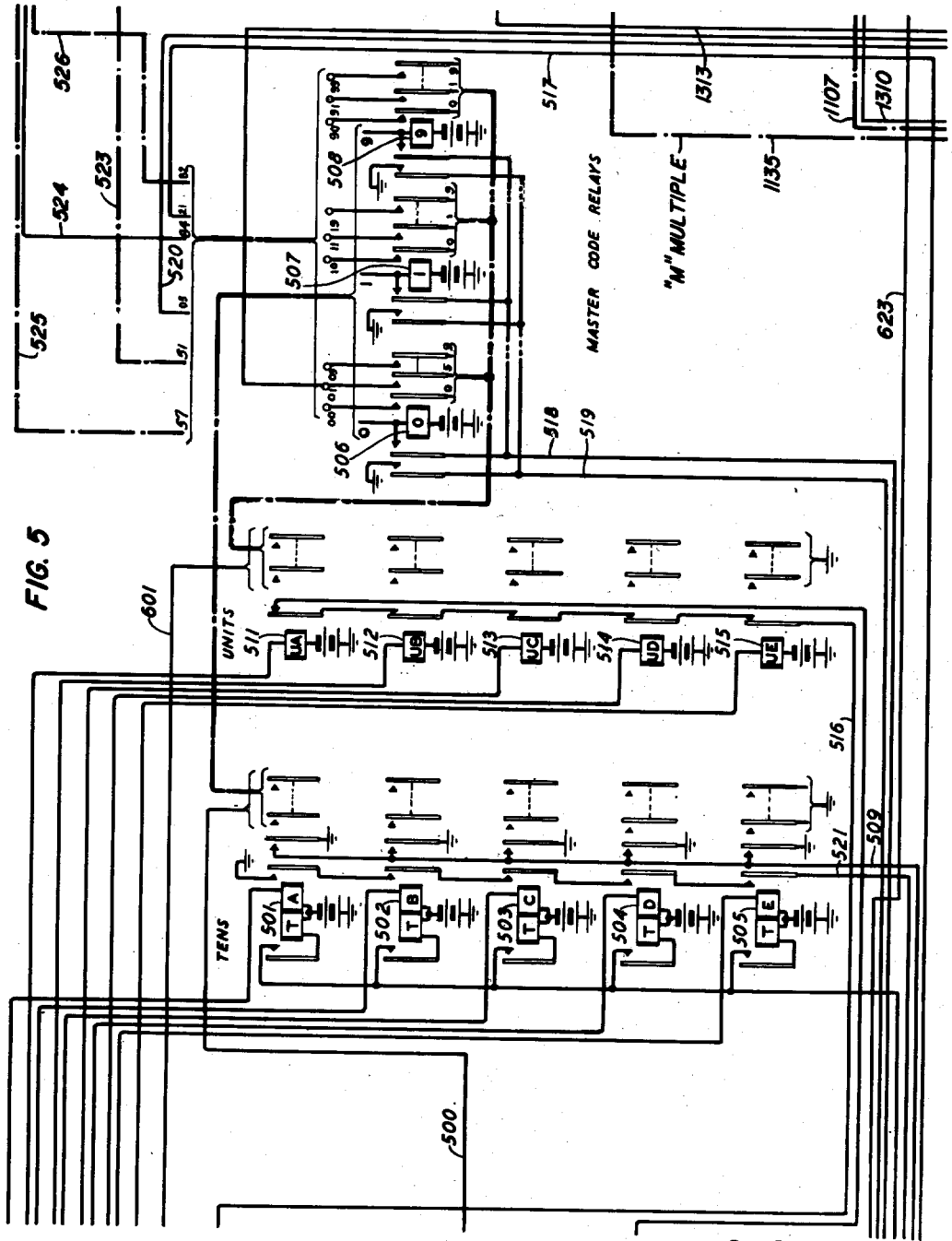
INVENTORS O. CESAREO
W. B. STRICKLER
BY
ATTORNEY INVENTORS
O. CESAREO
W. B. STRICKLER
BY John Attall
ATTORNEY

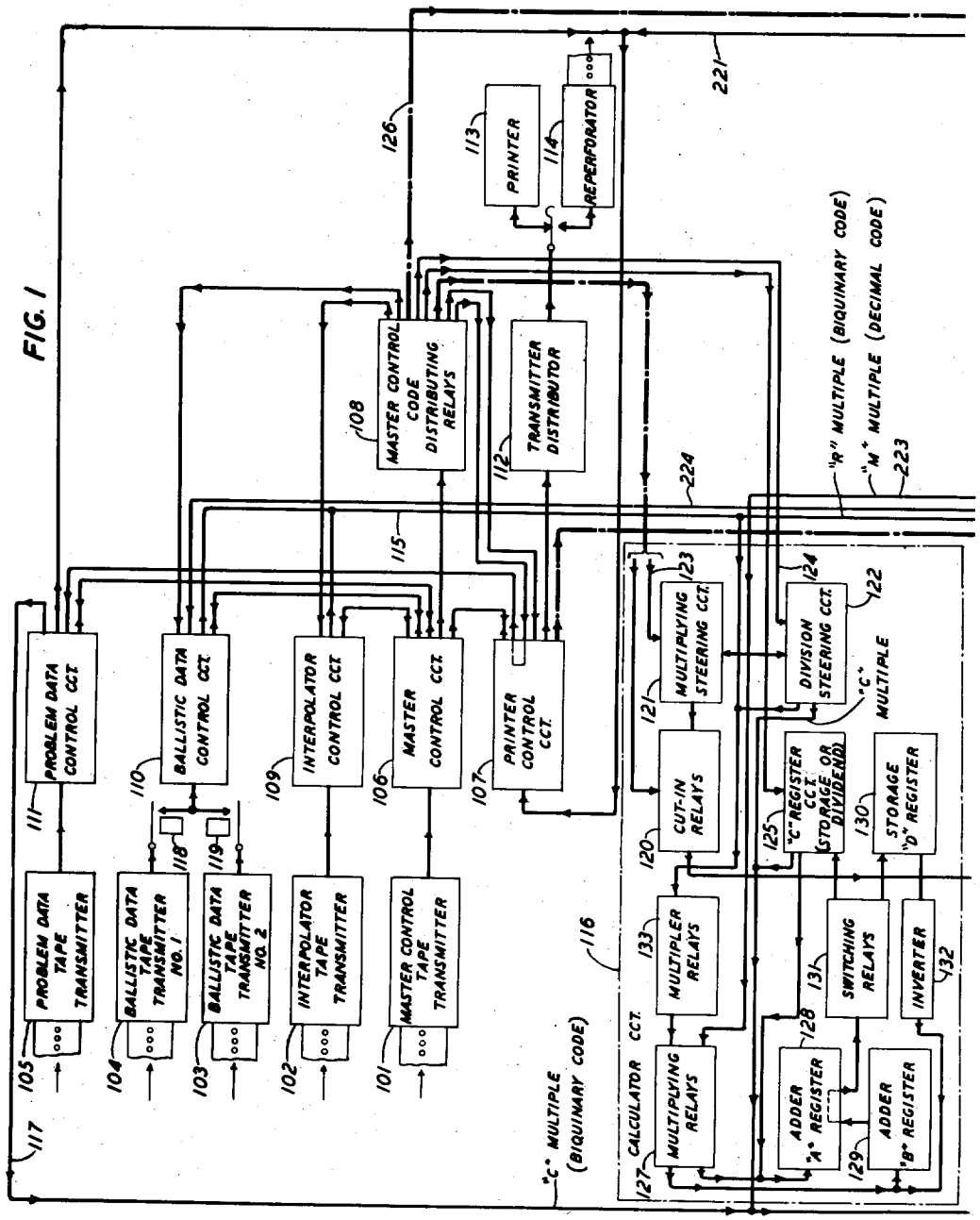

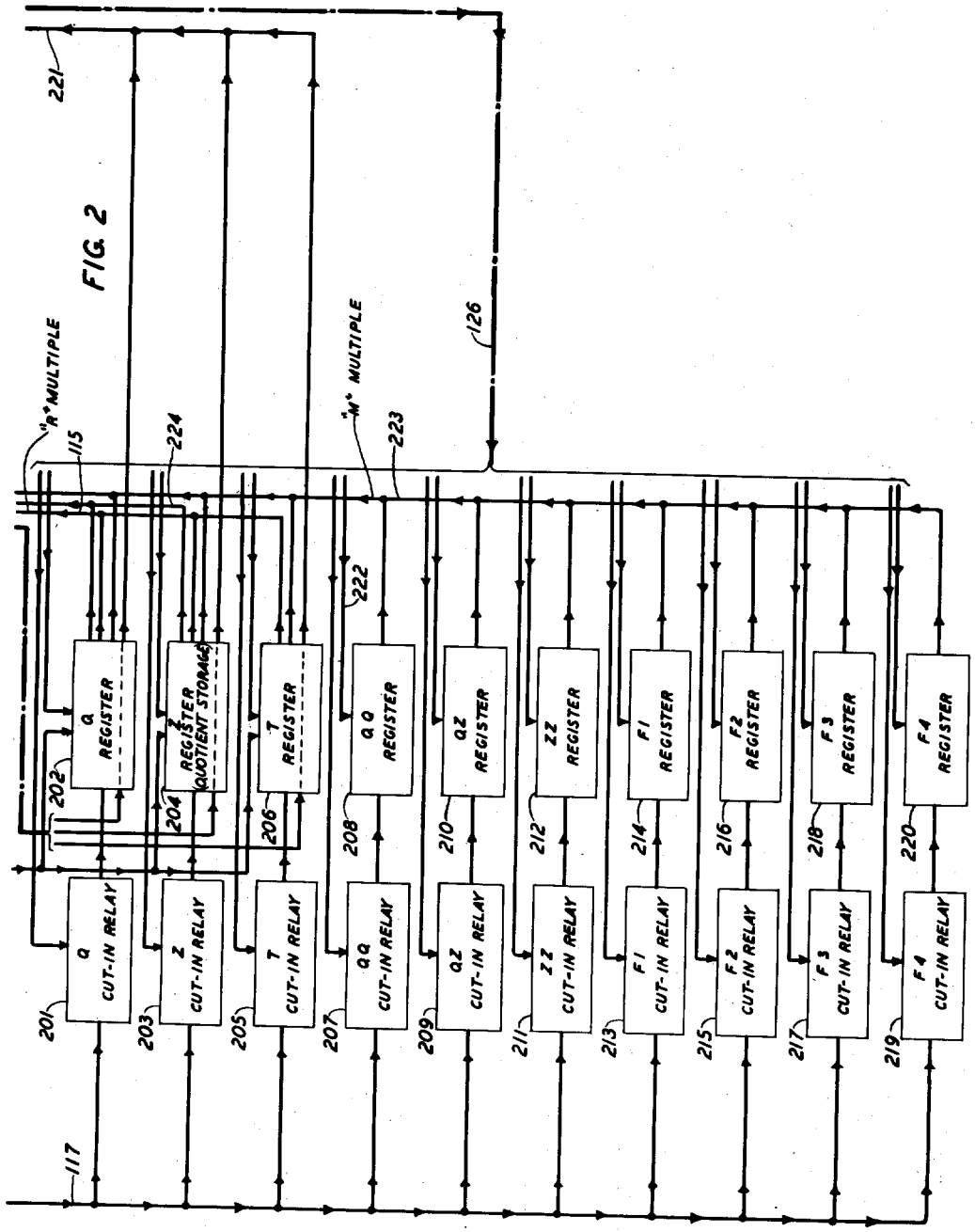

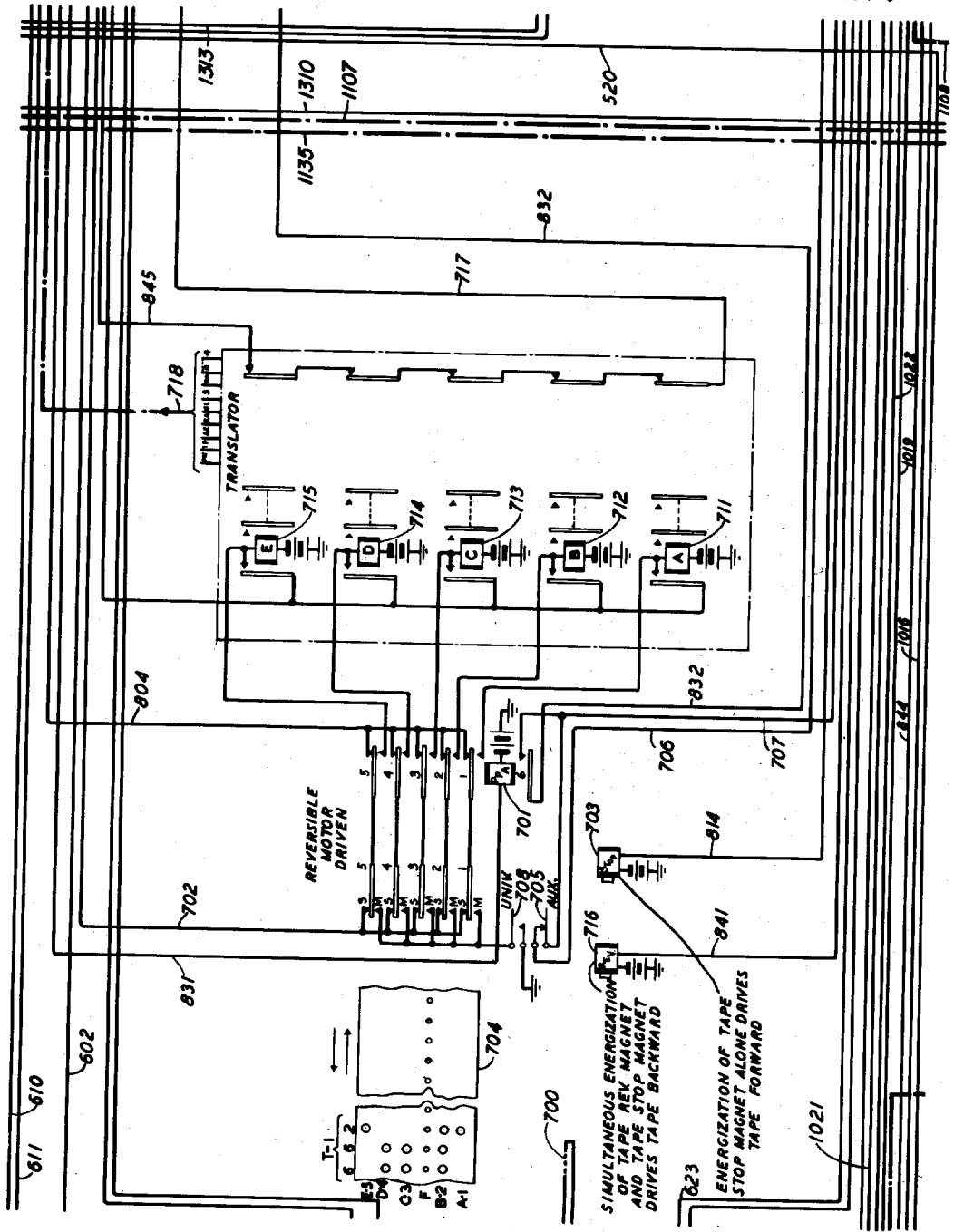

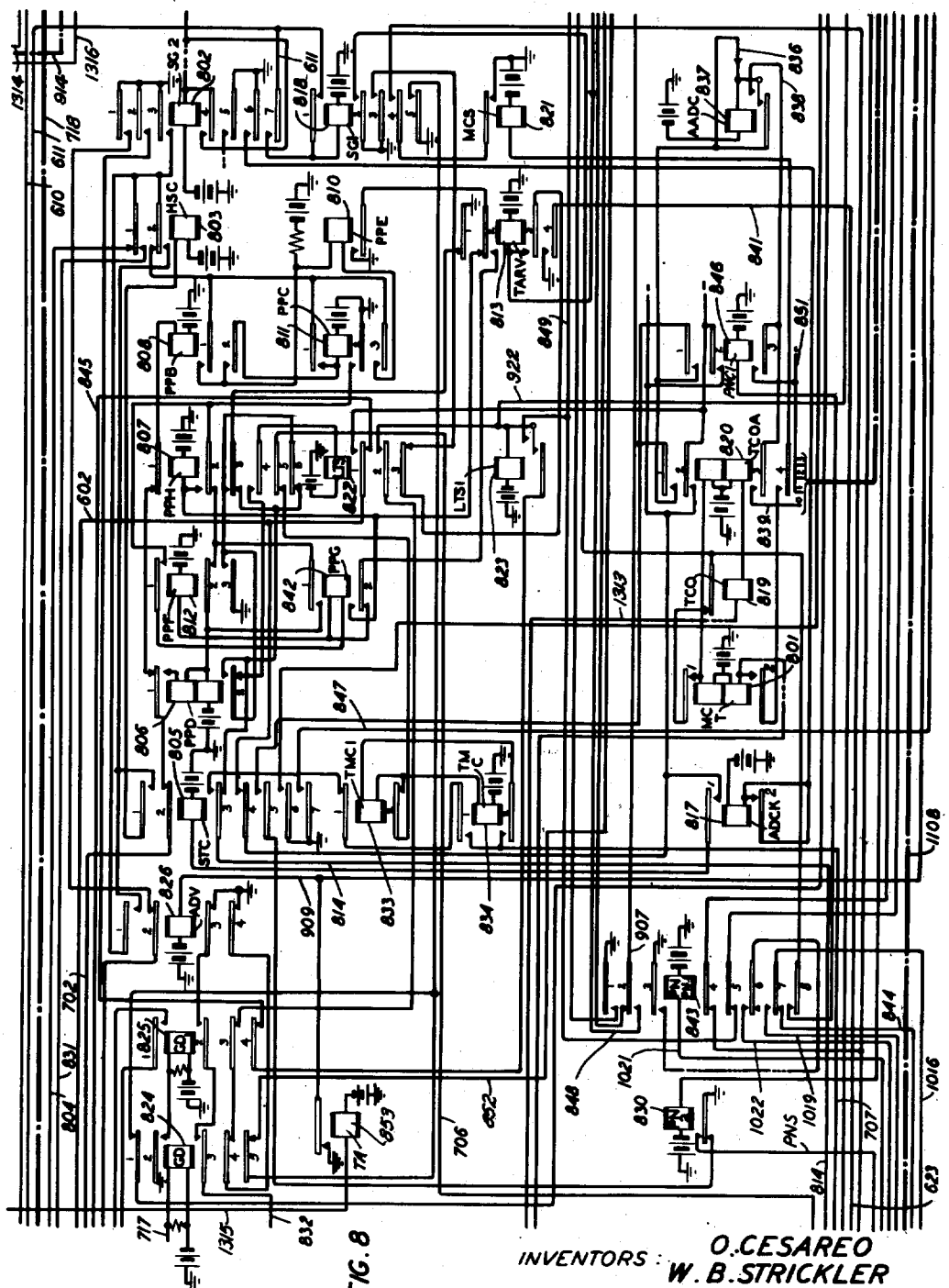

Oct. 19, 1954
O. CESAREO ET AL
2,692,082
AUTOMATIC CALCULATOR
Filed Dec. 17, 1946
11 Sheets-Sheet 8
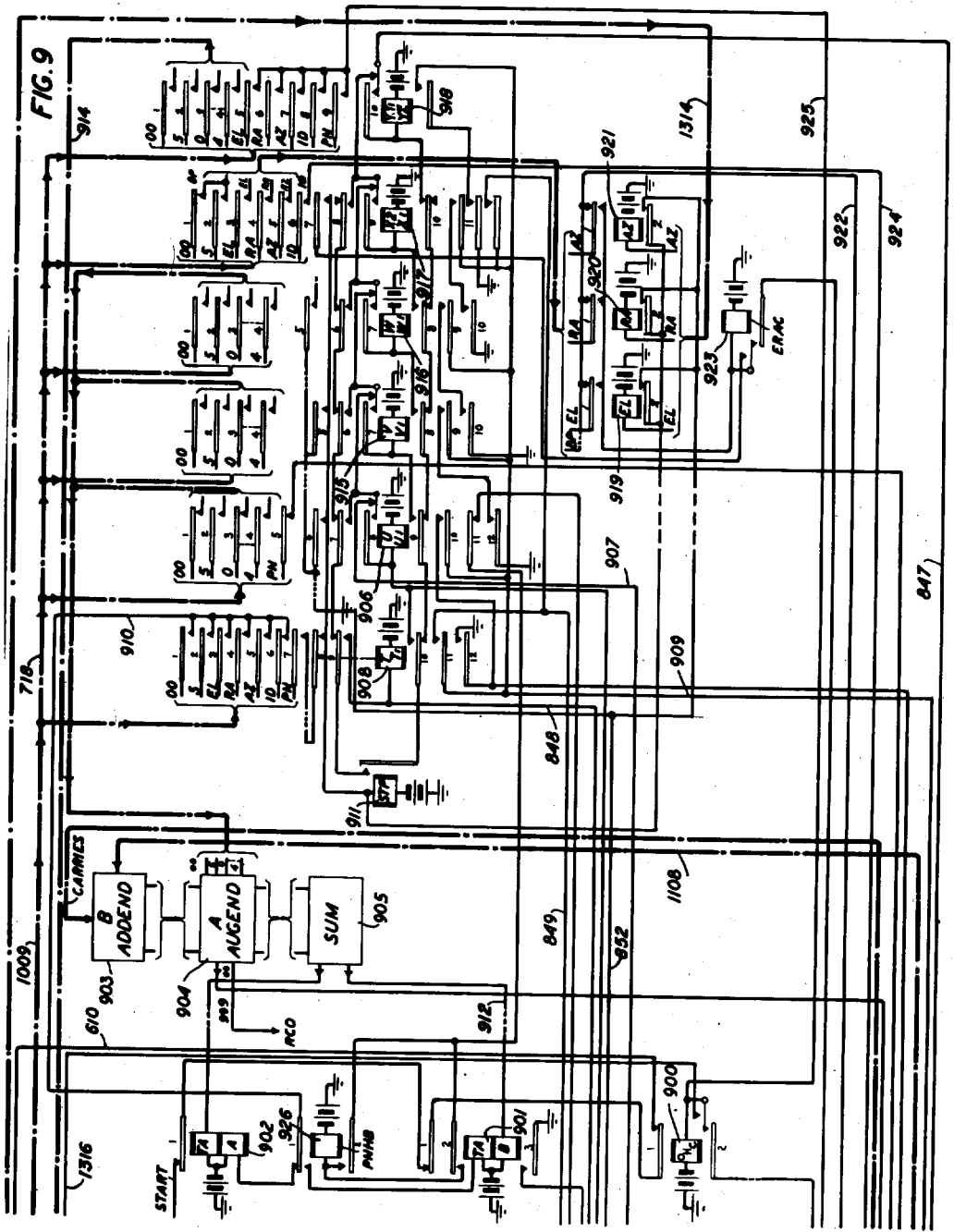
INVENTORS
O. CESAREO
W. B. STRICKLER
BY John Attall
ATTORNEY

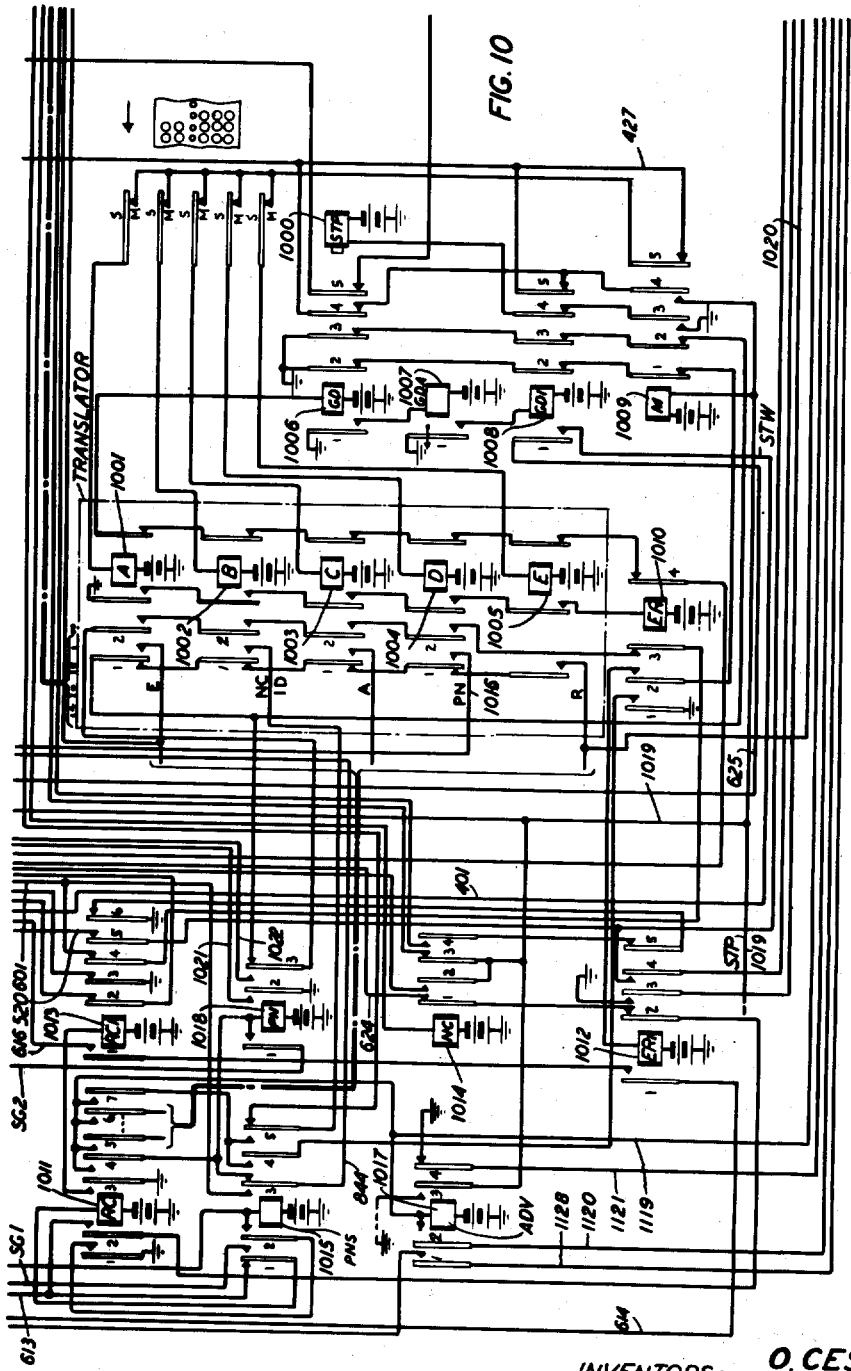

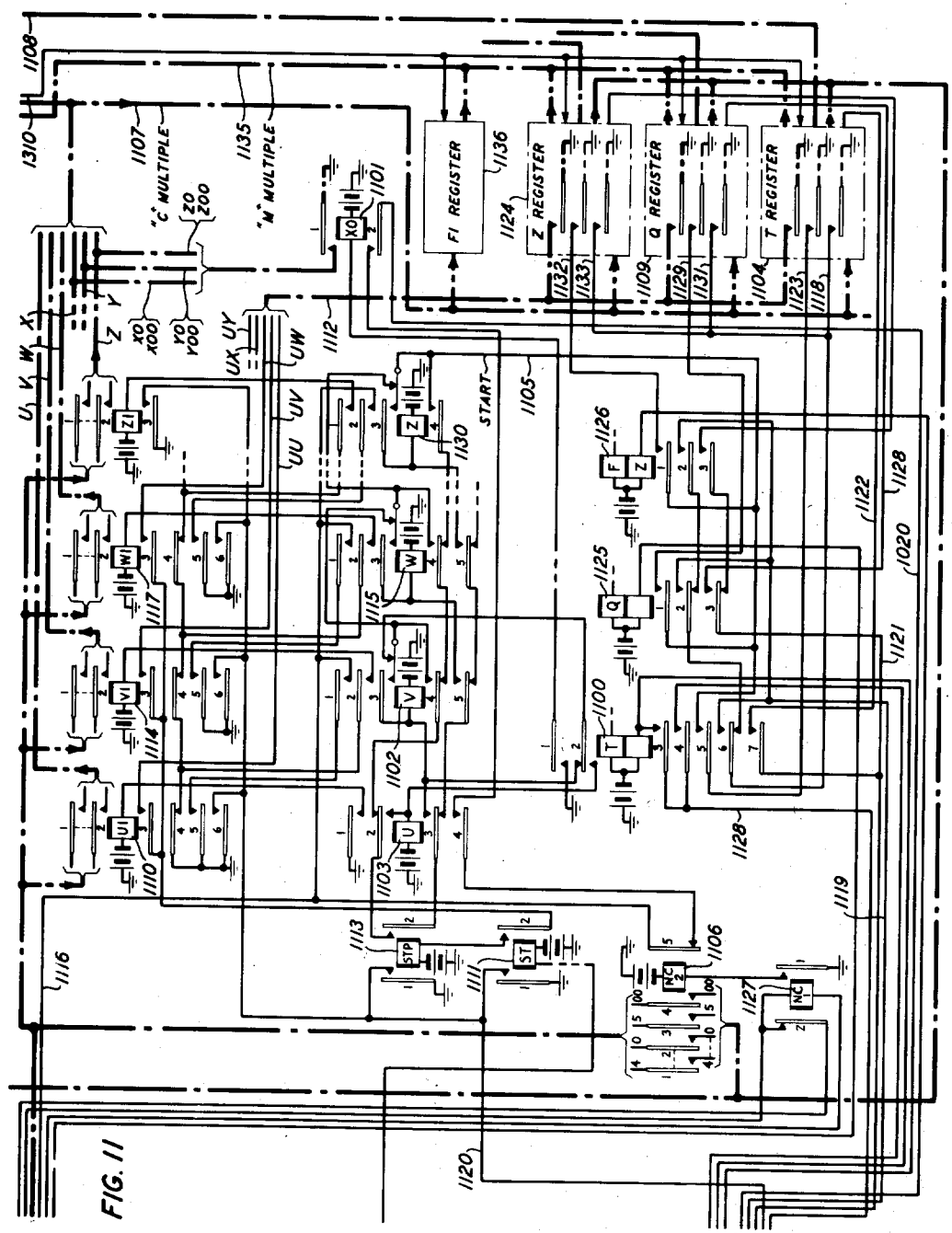

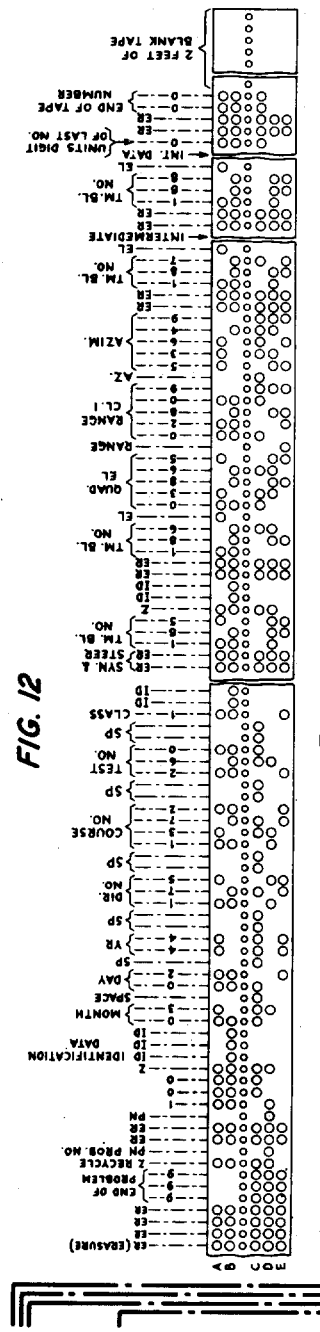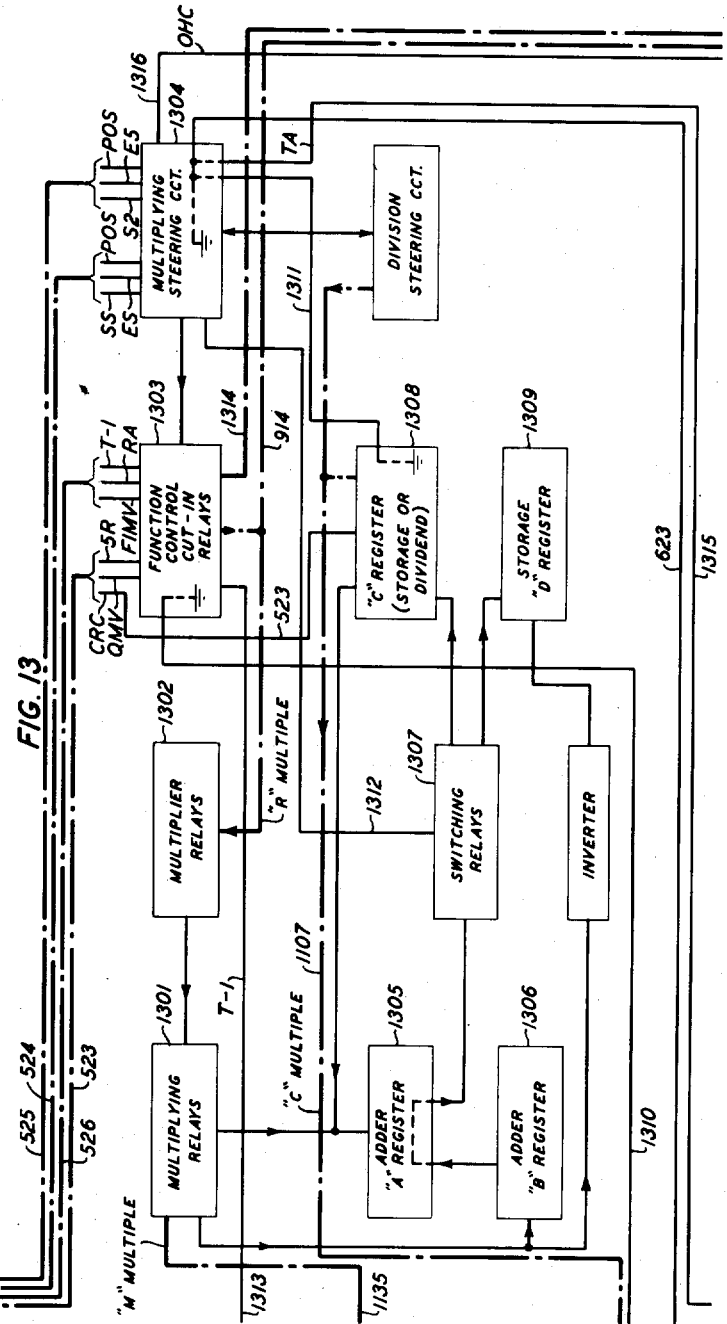

Patented Oct. 19, 1954

2,692,082

UNITED STATES PATENT OFFICE 2,692,082

AUTOMATIC CALCULATOR

Orfeo Cesareo, Washington Township, Bergen County, and Walter B. Strickler, East Orange, N. J., assignors to Bell Telephone Laboratories, Incorporated, New York, N. Y., a corporation of New York Application December 17, 1946, Serial No. 716,754

9 Claims. (Cl. 235—61)

This invention relates to calculators and particularly to electrical devices by which mathematical calculations may be carried out by the movement of simple electromagnetic means without the use of gear trains, number wheels, cams and other mechanical elements.

An object of the invention is to provide calculating means which will perform long and complicated operations in a minimum of time and with a minimum of apparatus. Another object is to provide for great flexibility in the entry of problem data into a calculator.

In mathematical parlance a function is a magnitude which may be calculated from an argument. Thus the surface and volume of a sphere are functions of its radius which is the argument. Further, a magnitude may be a function of any number of arguments, so that a product is a function of the two arguments known as the multiplicand and the multiplier.

The calculation of many functions from given arguments is at times a long and arduous operation and is always subject to human fallibility so that in the past extensive calculations have been made, carefully checked and the results tabulated and indexed by the arguments. The simplest of such tables are the multiplication tables drilled into the memory of every schoolboy. Others are such tables as those used by the navigator and the astronomer and recorded in great tomes. There is thus available to the mathematician a great mass of precalculated functions which is in constant use so that it is common practice in solving many problems to "look up" a function which may fit into as a part of such problem rather than to calculate it anew. An object of the invention is to adapt the use of massed and known information to a calculator so that during the process of calculation the calculator may automatically "look up" a value needed as part of the problem data.

In making a long and complicated calculation it is common practice to calculate a plurality of functions each corresponding to a different argument and generally these arguments are arranged in a logical sequence so that the calculated functions represent a series of points which may be plotted to establish a "curve." The calculation of each point follows the same routine, the only difference being that different problem data is used in each instance. Accordingly in the present instance the calculator is controlled in its pattern of operation by a master or routine index, herein specifically in the form of a tape on which the routine operational orders are recorded by code perforations. This routine tape will be arranged to operate cyclically, that is for the calculation of each point or function the routine tape will cause the calculator to operate through one complete cycle of its pattern of operations, for each argument entered.

It is therefore a convenient arrangement to have a routine tape in the form of an endless loop with one or more cycles of operational orders recorded therein and a separate problem data tape containing the arguments arranged in successive blocks. Then in order to supply other problem data such as observed readings related to the arguments or known information needed in the solutions such additional problem data is supplied on additional problem data tapes and these are placed in transmitters which may be moved at will in either direction so that the needed data may be selected.

A feature of the invention is a tape-controlled calculator having a routine tape containing operational orders for controlling the pattern of calculation, a principal problem data tape for feeding argument values into the calculator and a plurality of other problem data tapes to feed other values as called for into the calculator. The routine tape will contain the operational orders for one or more complete cycles of calculation and may be in the form of an endless loop having a single cycle if a comparatively small number of cycles of calculation are to be performed or several cycles if a large number of cycles entailing considerable wear are to be performed. The problem data tapes are all essentially alike, each having information grouped in blocks recorded thereon. The information contained in the principal problem data tape may be considered the arguments of the problems and this information in the form of a series of numbers will be fed into the calculator one at a time as called for by the pattern of calculation. The action of the principal problem data tape transmitter will be on a straightforward step-by-step basis. The other problem data tapes will be of two kinds, one containing observed data related to the data on the principal problem data tape and another containing known information such as coefficients from ballistic tables, tables of sines, tangents, logarithms and so forth. The data in all the problem data tapes will be recorded in blocks, each identified by a block number. In the pattern of calculation a cycle of calculation consists of the operation of the calculator through one complete cycle of operational orders from the routine tape and one complete block of data from the principal problem data tape. The other problem data tapes are placed in transmitters which may be driven either forward or backward so that a particular block may be sought and data thereafter taken from such a block. In the calculating operations the block of data being used from the principal problem data tape will determine the blocks which must be sought in the other tapes. By way of example, when an interpolated value is to be established, the corresponding values from four successive blocks must be sought and used. It should be noted that various types of calculation may require different numbers of tapes. A simple problem might require merely a routine tape and a single problem data tape while a more complicated problem may require in addition both a gathered data problem tape and one or more of the so-called table tapes containing known information. The routine tape of course will control the switching from tape to tape as required to enter the wanted information into the calculator.

A feature of the invention may thus be said to be the combination of a routine tape for determining the pattern of calculation operations, a principal problem data tape for the supply of problem arguments and one or more auxiliary problem data tapes for the supply of other necessary information. Stated otherwise, a feature of the invention is the combination of a cyclically operating master pattern control, a source from which argument values may be successively entered and one or more sources of selectable data. Again a feature of the invention may be stated as the combination of a routine tape in a transmitter driven forwardly to transmit each code separately and successively, an argument tape in a transmitter driven forwardly to transmit each code separately and successively under control of said routine tape and one or more problem data tapes, each in a transmitter driven either forwardly or backwardly under control of said routine tape to transmit codes selected by calculation from the codes in said argument tape.

Another feature of the invention is a means for automatically returning the calculator to a starting point when and if some trouble occurs which would otherwise stop any further operation thereof, so that the calculation of a new problem may be started. The device is provided with many check circuits for controlling the continuing operation thereof most of which will bring the operations to a halt and will display a signal giving a general indication of the trouble encountered. If such a stoppage occurs, it is desirable that there be some means to automatically start the device in operation again, for it is evident that where the device is left to operate unattended for long periods much time might be lost if it were allowed to stand idle after it is brought to a halt. Consequently timing means are provided which come into operation a small interval of time after a stoppage occurs and which will result in an automatic restarting operation. Where the calculator is working on a problem entailing a large number of calculations in which the result of one calculation is not carried over into the next calculation, then the calculation in which the stoppage occurred is abandoned and the next one started. There are, however, other types of problems each including a large number of separate calculations, each of which requires one cycle of operations in which the result of one is carried over into the next, then it being obviously useless to attempt a succeeding calculation, means are provided to not only recycle the device, but in addition to move on to another and entirely different and unrelated problem. Since the device is one which may operate over periods of hours, days or even longer intervals providing sufficient data is available, it is wasteful to risk a stoppage which might extend over many hours and hence means are provided to abandon any calculation which cannot be completed and start anew.

Another feature of the invention is the means for readjusting the problem data tapes when in the process of calculation it is found that certain wanted problem data is unavailable.

The data recorded in the two tapes used in the problem data transmitter and the interpolator transmitter is recorded in serially numbered blocks and each tape therefore has an identical series of block numbers. In a first type of operation, herein termed class 1 operation, the first block number encountered in the problem data transmitter is entered into the device and a new block number is calculated which is smaller in value than that entered. This operation is useful in making certain calculations of errors produced by a gun director from coordinates observed by a tracker. In class 1 operations the observed coordinates including quadrant elevation, range and azimuth for each second or equal part thereof are recorded in the tape placed in the problem data transmitter. At exactly the same times the gun orders including angular height, fuze and angle of train are recorded in the tape placed in the interpolator transmitter. The times at which these groups of data were taken are used as block numbers and are placed in serial order. In class 1 operation therefore, the tape containing the observed coordinates is placed in the problem data transmitter and that containing the gun orders derived from the observed coordinates by the director is placed in the interpolator transmitter. At the start of a calculation the problem data in the first time block in the problem data tape is examined and a time interval is calculated which must be subtracted from the time used as an index of this time block, thus designating another time block lower in number thany any time block number recorded on either tape. When the interpolator transmitter starts to hunt for this calculated time block it will find that it does not exist, first through failure to find such a number and second through encountering a special recycle code which directs the problem data transmitter to advance to the next time block. This operation will be repeated until a calculated time block is found which contains sufficient information for the purposes of calculation. In another type of operation, known herein as class 2 operation, the calculated time interval must be added to the value of the time block. Consequently near the end of the problem the calculated time interval will produce a time block number greater than any such number recorded in the interpolator tape and hence again when the interpolator transmitter starts to hunt for this calculated time block, it will find that it does not exist, first through failure to find such a number and second through encountering a special recycle code which established the fact that the end of the problem or even the end of the tape has been reached and prevents any further trials. In another instance where the data for some one time block has not been provided the block number is recorded in the regular succession of such numbers but in place of the missing data certain special signals are provided which will cause the other tape to advance and thus forego the calculations for that block. Thus a feature of the invention may be said broadly to be the provision of special recycle signals for controlling the calculator by causing it to automatically advance to another cycle of calculation when needed data is unavailable. More broadly stated, a feature of the invention may be said to be the combination of a plurality of problem data tapes in a corresponding plurality of tape transmitters one of which has control over the remainder and means responsive to the absence of problem data in a hunted block of problem data in a controlled tape to advance the controlling one of said tapes to a new block.

The drawings consists of ten sheets having twelve figures, as follows:

Figs. 1 and 2 placed with Fig. 1 above Fig. 2 form a flow chart having many of the aspects of a schematic circuit diagram and which may be used to gain an understanding of the interrelation and the interaction of the various components of the device in which the present invention is incorporated;

Fig. 3 is a block diagram showing how Figs. 4 to 11 inclusive and Fig. 13 may be placed to form a schematic circuit diagram to illustrate the operations when the device is recycled and particularly how a tape may be moved in either a forward or a backward direction;

Fig. 4 shows a schematic representation of a reversible tape transmitter;

Figs. 4 and 6 show the recycle circuits for the master control circuit in which such tape transmitter is employed;

Fig. 5 shows the tens and units relays operated by the transmitter and indicates the code relays whereby any one of one hundred code leads or sets of code leads may be selected by a two-digit code;

Figs. 7, 8 and 9 represent the interpolator control circuit, Fig. 7 showing the transmitter and the translator relays operated thereby, Fig. 8 showing the circuits for controlling the movements of the said transmitter and Fig. 9 indicating the steering chain for controlling the distribution of data read off the interpolator transmitter tape;

Figure 6:
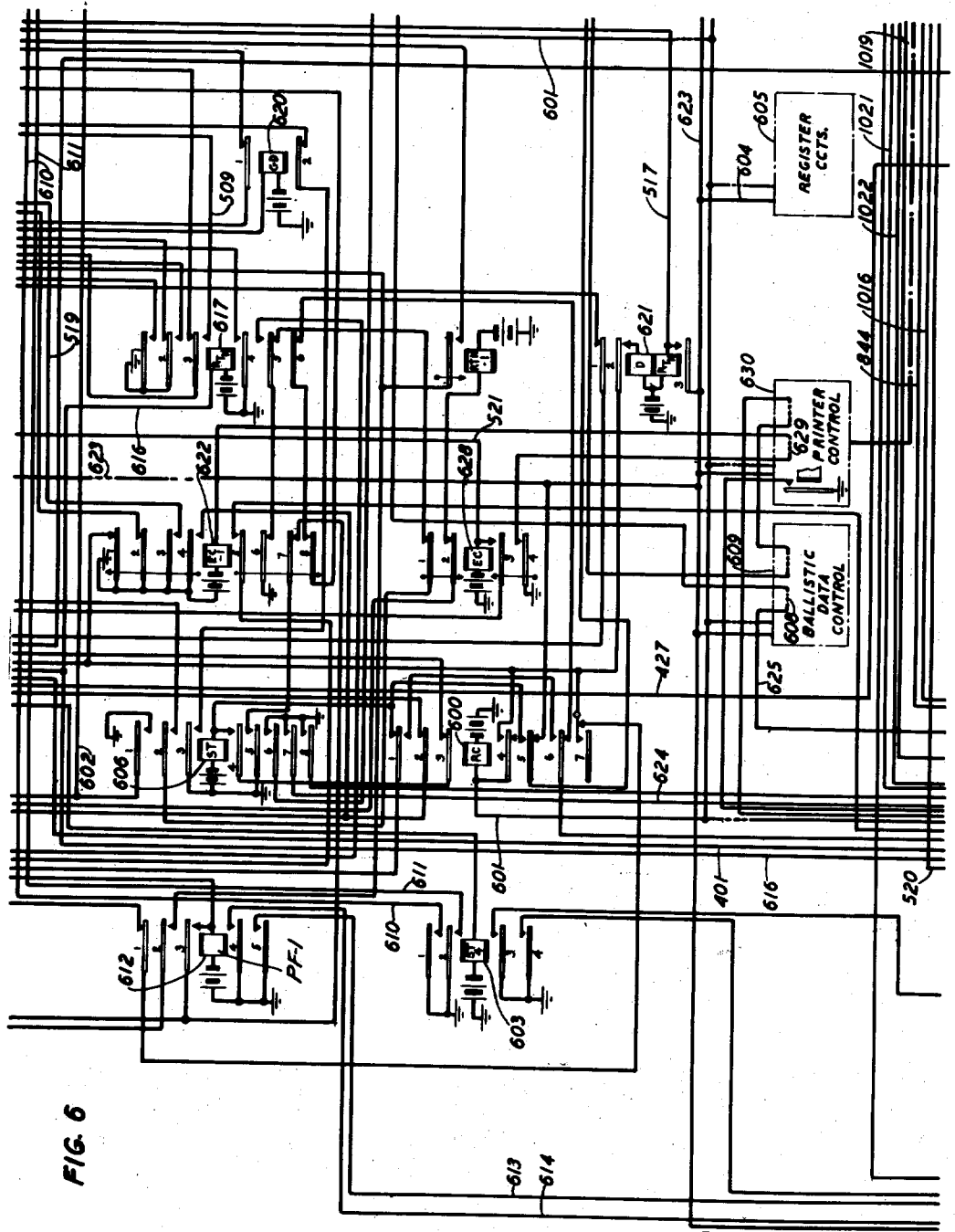

Figs. 10 and 11 represent the problem data control circuit, Fig. 10 showing the transmitter magnets, the translator relays and in general the control circuits therefor and Fig. 11 indicating the steering chain for controlling the distribution of data read off the problem data transmitter tape; and Fig. 12 illustrates a problem data tape such as one that would be used in the problem data transmitter in class 1 operation by showing the manner in which it is perforated, the meaning of the perforations, and the names of the symbols as used herein.

Fig. 13 shows a schematic block diagram of certain elements of the calculator and the manner in which these elements are connected to the master control circuit, the interpolator control circuit, the problem control circuit and the various registers.

This application is one of a group of seven applications all based on the same arrangement. The Andrews-Vibbard application is a full and complete disclosure and includes a disclosure of the present invention, the other applications including the present application being abbreviated disclosures of certain features of the complete device, as follows:

| Applicant | Serial No. | Filing Date | Subject |
| --- | --- | --- | --- |
| Andrews-Vibbard | 716, 680 | December 17, 1946. | Automatic Calculator. |
| Vibbard | 716, 827 | do | Control Circuit.[1] |
| Strickler | 716, 783 | do | Testing System. |
| Juley | 716, 793 | do | Switching Control System.[2] |
| Cesareo | 716, 753 | do | Automatic Code Translating System.[3] |
| Andrews | 716, 762 | do | Calculator Sign Control Circuit.[4] |

[1] Patent No. 2,671,611, granted March 9, 1954.
[2] Patent No. 2,666,578, granted January 19, 1954.
[3] Patent No. 2,625,328, granted January 13, 1953.
[4] Patent No. 2,679,977, granted June 1, 1954.

The device in which the present invention is incorporated is a calculator operated by electrical circuit change, in which each new circuit operation is dependent upon the successful completion of a previous operation. It consists essentially of a calculating arrangement, a plurality of tape transmitters of the kind commonly used in printing telegraph operation for entering both operational orders and mathematical information, a plurality of registers in which mathematical information from the tapes or calculated by the calculator may be stored temporarily and a printing device also of the type commonly used in the printing telegraph art for recording various items of information including the arguments of the problems, partial results and the final results.

In Fig. 1 there is shown a master control tape transmitter 101 which is used to transmit operational orders from a so-called routine tape into the master control circuit 106 which has general control over all the operations of the device. Other similar transmitters are the interpolator tape transmitter 102, the ballistic data tape transmitters 103 and 104 and the problem data tape transmitter 105, each with its control circuit. All of these transmit mathematical information from appropriate tapes and all of this information is generically problem data. That provided by the problem data tape constitutes the aruguments of the problem, that from the interpolator tape constitutes correlated or empirical data, and that from the ballistic tapes constitutes table information or precalculated data such as is usually found in the so-called tables of functions such as trigonometric, logarithmetic ballistic and other such data. In the operation of this device the routine tape is operated cyclically, that is, it runs through its transmitter over one complete set of routine orders necessary for the calculation of a function from one given argument or set of arguments. The problem data tape usually contains a series of arguments and is moved forwardly step by step under control of the master control circuit, the master tape operating through one cycle for each argument. The remaining tapes contain necessary information and may be moved from point to point either forwardly or backwardly to transmit information called for by the master control from time to time during the calculation.

The calculator here generally shown as included in the broken line rectangle 116, consists primarily of four relay registers, the A register 128 constituting an augend element, the B register 129 constituting an addend element and the C register 125 and D register 130 being used alternatively as sum elements. All problems presented to the calculator are in the form of problems in multiplication and the calculation is actually performed by summing the values registered at various times in the A and B registers. For this purpose a set of multiplying relays 127 and a set of multiplier relays 133 are provided, by means of which a multiplicand operating the multiplying relays 127 may be multiplied by one digit at a time of the multiplier which operates the multiplier relays 133. There is provided a set of switching relays 131 for determining into which register, the C register 125 or the D register 130, the values in the A and B registers shall be summed. Values stored in the D register 130 may be transferred only to the B register 129, by way of an inverter 132. The inverter is a means by which the value being transferred from the D register to the B register may be transferred as it is or in its complemental form. Values stored in the C register 125 may be transferred either to the A register or transmitted out over the C multiple 117 for transfer to any one of the various registers shown in Fig. 2.

The calculator 116 is under general control of a steering circuit 121 which controls the various steps in a multiplying calculation cycle. When a problem in division is presented, an additional circuit, the division steering circuit 122, is brought into action to make the necessary changes and alterations in the calculating cycle. The cut-in relays 120, ordered into operation by the master control circuit 106 through the code distributing relays 108, operate to activate one decimal denominational order at a time of certain registers which then transmit over the R multiple 115 to operate the multiplier relays under control of the steering circuit 121. The division steering circuit, ordered into operation over the path 124, besides modifying the calculation cycle, provides a supply of multiplier digits over the R multiple 115 to the multiplier relays 133 as trial quotient digits and transmits the correctly calculated quotient digits over the C multiple 117.

There are in this device several trunk lines or paths over which information may be passed, as indicated by the arrow-heads on the lines representing these paths, such as the C multiple 117, the R multiple 115 and M multiple 223. The C multiple generally is for transferring information from the C register to any one of the various storing registers shown in Fig. 2. The M multiple generally is for transferring multiplicands from any of the registers of Fig. 2 to the multiplying relays 127 and the R multiple is for transferring multipliers, a digit at a time, from certain of the registers of Fig. 2 to the multiplier relays 133.

Fig. 2 shows a plurality of registers, such as 202, each with its cut-in relay, such as 201. The registers and the cut-in relays are controlled from the master control code distributing relays 108 over connections represented by the bundle 126. The master control circuit 106 is shown as having control over the other control circuits, such as the printer control 107, the interpolator control 109, the ballistic control 110 and the problem data control 111. The master control circuit 106 transmits operational orders from the master tape to the master control code distributing relays 108 which translates the routine orders into signals to control the various operations of the device.

The printer control circuit transmits information into the transmitter distributor 112 in translated form suitable for telegraphic transmission, either to a printer 113, where it is immediately recorded, or to a reperforator 114 where it is recorded in code suitable for later operating a printer or for reentry into the device for other calculating purposes.

In general, the calculating device consists of three main groups of apparatus, a calculator, a plurality of entry devices in the form of tape transmitters and a plurality of storage registers. The entry devices include a master or routine tape transmitter which transmits operational orders for the entry of values from the other tapes into the calculator or into the various registers or from the various registers into the calculator. In the embodiment of the invention disclosed herein and in the said Andrews-Vibbard application, a single routine tape transmitter is shown capable of issuing a cycle of routine orders. The tape provided for use in this transmitter is preferably in the form of an endless loop and it may have recorded therein one or several cycles of orders, depending on the probable use to which it will be put. The routine tape is used cyclically, that is, for one or one set of arguments entered the routine tape will issue one complete set of orders and then be adjusted to its starting point awaiting the entry of another argument or set of arguments.

The problem data transmitter holds a tape in which the arguments or sets of arguments are recorded and this tape is controlled to step forwardly a step at a time. Each argument or set of arguments is indexed under a so-called block number. In the typical example given in the said Andrews-Vibbard application, these block numbers are three digit time designations corresponding to the time intervals at which the information constituting the arguments and the correlated data were gathered.

The remaining tape transmitters are supplied with tape containing problem data in the form of data correlated to the argument data and table information. The transmitter herein known as the interpolator transmitter handles the correlated data and is so named because data recorded therein must be interpolated. In one specific use to which the device of the present invention is put, two tapes of similar nature and having correlated information under an identical series of block numbers are provided. One tape contains the observed coordinates displayed on the dials of a tracker and the other contains the coordinates derived from these and known as the gun orders and which are displayed on the dials of a director. For the calculation of the errors in the gun orders by the so-called class 1 operations the tape containing the observed coordinates is placed in the problem data transmitter so that these coordinates are used as the arguments of the problems while the tape containing the gun orders is placed in the interpolator transmitter so that the gun orders are used as correlated problem data. In class 2 operations the tape containing the gun orders is placed in the problem data transmitter so that the gun orders are used as the arguments of the problem while the tape containing the observed coordinates is placed in the interpolator transmitter so that the observed coordinates are used as correlated problem data.

Class 1 errors indicating the amounts by which the gun orders transmitted to the gun by the director are in error are calculated in the following manner. It is assumed that a shell explodes directly on the target indicated by the observed coordinates at a given time known as the time of burst. From the values of the slant range and angular height of the target taken from the observed coordinates and from known ballistic information the elapsed time of flight is calculated and this period of time subtracted from the time of burst gives the firing time. It is, therefore, obvious that the first time block in the problem data transmitter tape will, by calculation, call for a time block in the interpolator transmitter tape which is non-existent and the device will have to be recycled. Even the second and third time blocks in the problem data transmitter tape may produce results calling for a recycle operation and, hence, such operations will be repeated until normal operation is attained. Thereupon, since the firing time generally includes a fractional component it will not be possible to examine the recorded values of gun orders and find a set exactly corresponding to this firing time figure and, hence, actual gun orders will have to be derived by interpolation and such gun orders will be spoken of as interpolated gun orders. However, these may be in error and, hence, from the observed coordinates and by the aid of known ballistic information, theoretically perfect gun orders are calculated. The differences between these calculated perfect gun orders and the interpolated actual gun orders constitute the so-called class 1 errors.

Class 2 errors indicating the amounts by which an exploding shell misses the target are calculated in the following manner. It is assumed that the gun is fired in accordance with the gun orders transmitted by the director at a given time known as the firing time. From the values of the quadrant elevation and fuze setting taken from the recorded gun orders and from known ballistic information, the elapsed time of flight is calculated and this period of time added to the firing time gives the time of burst. Now it will be obvious that before the last time block in the problem data transmitter tape is used a time block in the interpolator transmitter tape will be calculated and called for which is non-existent and, therefore, the device must be recycled. It is also obvious that the use of larger numbers as time blocks in the problem data transmitter tape will produce increasingly impossible results, hence, means are provided class 2 operation to produce a major recycle operation—not a mere advance to another time block in the problem data transmitter tape—but an advance to a completely new problem. No repeated trials are made as under class 1 operation. Under normal operation when the time blocks called for in the interpolator transmitter are present in such tape, then since the calculated time of burst generally includes a fractional component it will not be possible to examine the values of the observed coordinates and find a set exactly corresponding to this time of burst and, hence, observed coordinates will have to be derived by interpolation and such actually observed coordinates will be spoken of as interpolated coordinates. However, the gun orders may be in error and, hence, from the possibly incorrect recorded gun orders and by the aid of known ballistic information correspondingly inaccurate observed coordinates are calculated. The difference between these calculated coordinates and the interpolated coordinates constitutes the so-called class 2 errors.

It will, therefore, appear that the interpolator transmitter tape is one which will have to be examined under calculated conditions and since the time block may be either before or behind the particular point of such tape effectively present in the transmitter, the transmitter must be arranged to move the tape either forwardly or backwardly.

Other problem data tapes are known as table tapes since they carry known information of the kind usually found in tables. In the embodiment herein disclosed there are two such tapes known as ballistic tapes since they carry information derived from ballistic tables. This information also is arranged in blocks and in this case the block number is derived during calculation. The ballistic tape transmitters, like the interpolator transmitter are arranged to drive their tapes either forwardly or backwardly.

The following description will illustrate the manner in which the device is recycled and the manner in which the various tapes are moved, the master or routine tape cyclically, the problem data tape step by step forwardly and the other tapes either forwardly or backwardly for hunting and then step by step forwardly after a wanted block has been found.

Fig. 12 shows a problem data tape carrying observed coordinate data and is one which would be placed in the problem data transmitter in class 1 operation to supply the arguments of the problem or which would be placed in the interpolator transmitter in class 2 operation to supply the correlated information. In form the two tapes, one placed in problem data transmitter and the other placed in the interpolator transmitter, are identical, the only difference being in the value of the numbers recorded within the time blocks. The tape is a conventional five-place code printing telegraph tape having two lines of code perforations above and three lines below a continuous line of small sprocket tooth holes. Directly above the view of the tape there is a line of numbers which would be printed if and when the printing control circuit caused the codes of this tape to be read off to the printer. The preliminary part of this data is known as identification data and is always printed, while the remainder, comprising groups of numbers headed by the block numbers, is used in the calculations. In a line above this numerical data is an explanation of the other code symbols used. For instance, the first four codes shown are known as ER (for erasure) signals and are used for various purposes—one of which is to erase a wrongly punched code—means being provided in connection with certain of the tapes to ride over such a symbol without other effect. These signals, of which there should be a minimum of four and preferably as many as ten, are useful in separating the printed records of two different problems, that is, providing enough space between the records to make it visually evident to casual inspection that there are records of two different problems. Each of these tapes may contain data for a number of problems so it should be noted that the tape pictured in Fig. 12 starts near the end of one problem and the beginning of the next. In synchronizing the tapes the problem data transmitter will start functioning and will read off the next group consisting of three repetitions of the digit 9. This has no effect in the problem data circuit (except to register these values in the T register in order to get back the satisfaction signal to cause the advance of the transmitter). Next the Z symbol (so called because it is the code for Z used in the standard printing telegraph code) is encountered. This is a recycle signal which causes a general release (including the release of the number 999 registered) and a restart. The next group consisting of a PN (problem number) symbol is by-passed because after a recycle the problem data tape will move forward until the next ER signal is found, whereupon the problem data tape transmitter will then signal the interpolator transmitter circuit that it is about to register a problem number, then proceed to read the problem number into a register and finally camp on the following Z symbol. The Z code cannot become effective until the interpolator transmitter in response to the PN signal has advanced its tape, read off the problem number into a three-digit adder and the comparison of the two numbers from these two tapes has proved that they are identical. If they are not identical then the tape in the interpolator transmitter is moved forwardly or backwardly in accordance with the result of the comparison which not only indicates the lack of identity between the numbers but also shows whether the number from the interpolator tape is lower or higher than the number from the problem data tape. When correspondence of the problem numbers from the two tapes has been established then the circuits in the problem data transmitter circuit will respond to the Z code on which this transmitter is resting whereupon this circuit will be recycled. Several ID (identification data) signals are now read off the problem data tape, the problem data is read off and printed, with proper spacing to set off the printed record. The identification data is followed by a pair of ID symbols to signal the end of the identification data and then a pair of ER symbols such as always placed before a block number. In Fig. 12, a block number 186 is shown properly followed by numbers representing quadrant elevation, range and azimuth, the observed coordinates. Preceding this block 186 there is shown a block 185, by way of example, where for some reason the data has not been available. Since it is desirable to keep an unbroken succession of block numbers in the tape which will go into the interpolator transmitter, the block number 185 is recorded and then followed by a Z and two ID symbols so that if this tape is driven to this block number this "missing data" signal will recycle the device.

At the beginning of the tape, as hereinbefore mentioned, there is a succession of three codes for the digit 9. This 999 is an "end of problem" signal. In class 2 operation, when a block number higher in value than any recorded in the tape in the interpolator transmitter is called for, this number will be encountered after the last block number has been tested. It will give the information that the block number called for is not only not available but that no other still higher block numbers are available and, therefore, further operations in the problem now under solution are useless and advance to an entirely new problem must be made.

In this case the tape in the interpolator transmitter advances to the first PN symbol which will then cause the tape in the problem data transmitter to advance until it encounters the Z or recycle signal. The two tapes are then advanced to the second PN symbol, the new problem numbers are compared and the new operations started. Also in Fig. 12 there is shown an "end of tape" signal (at the extreme right-hand end of the tape). This will bring the operations of the device to a halt when it is encountered either in the problem data transmitter (in class 1 operations) or in the interpolator transmitter (in class 2 operations).

It will thus be seen that a recycle signal may be effected in a number of different manners.

Let us assume, by way of example, that the tape in the problem data transmitter has reached a Z code. It may be noted that the problem data tape transmitter is a straightforward step-by-step conventional device. The tape reading fingers normally rest against the tape and those which find holes protrude through such holes and close their marking contacts. When the stepping magnet 1000 is energized, the fingers are withdrawn from the tape and the tape sprocket wheel is moved to advance the tape to the next code. Upon the release of the magnet 1000 the fingers read the new code. The Z code will cause the operation of relays 1001, 1002, 1003 and 1004 and result in the operation of the recycle relay 600 in the master control circuit over conductor 601. With relays 1001 to 1004, inclusive, operated, a circuit may be traced from ground, armature 3 and back contact of GD relay 1006, armature 3 and back contact of GD-1 relay 1008, armature 2 and back contact of M relay 1009, the armature 2 and front contact of each of the relays 1001, 1002, 1003 and 1004, back contact and armature 3 of ER relay 1010, back contact and armature 4 of RC-1 relay 1013, conductor 601 to the winding of RC relay 600 and thence to battery.

The ground sent out over conductor 601 will cause the operation of the RC relay 600, and the consequent release of the start relays ST and ST-1 in the master control circuit. The release of ST-1 relay 400 removes ground from conductor 427 and therefore releases the relays 1001 to 1004 to remove the recycle ground on conductor 601. The recycle relay, however, has locked through its armature 4 and front contact and the back contact and armature 1 of the end of cycle relay 622, and will thus remain operated until the master control tape has been returned to its starting point and has encountered the end of cycle code.

For the present purposes it is sufficient to say that the operation of the recycle relay is akin to the operation of a general release relay since it opens a number of locking circuits and releases a number of relays which can only be operated again when the routine operations are those performed at the beginning of a cycle. For instance, the operation of relay 600 from the application of ground to conductor 601 opens both the original and the locking circuit for the ST relay 606 and this in turn causes the release of the ST-1 relay 400 by opening its circuit. The ST-1 relay cannot again operate until certain given conditions in other circuits are satisfactory. This is indicated by the operating conductor 401 in its path through the contacts of relay 1008 in the problem data control circuit, circuit 608 in the ballistic data control circuit 609, contacts of GD-1 relay 825 in the interpolator data control circuit back to ground at armature 6 of ST relay 606. Hence, the proper starting conditions must be attained in each of the dependent circuits before the specific start relay 400 is again operated.

It may be stated in general here and will be explained in detail hereinafter that a number of start relays are provided which operate in a certain sequence after the recycle relay has been operated. For instance the ST relay 606 will operate while the RC relay is operated when the NC circuit, which reports that the various other control circuits are fully released, is closed. Following this the ST-1 relay will respond when the various other control circuits have been activated by what might be termed their local recycle relays and certain down check circuits therein prove that their transmitters are normal and ready to proceed. Lastly there are the ST-3 and ST-4 relays which operate when the recycle operations in the master control circuit have been completed, the RC relay 600 and the end of cycle relay have returned to normal and the fingers of the transmitter are ready to transmit the first master code.

The release of ST-1 relay 400 closes a circuit from ground, the normal contacts of the R-BK key 402, the normal contacts of the remote R-BK key 403, armature 4 and back contact of R-BK relay 404, back contact and armature 1 of ST-1 relay 400, winding of PF relay 405 to battery.

Upon the operation of PF relay 405, a circuit is closed from ground, armature 3 and front contact of PF relay 405, armature 1 and front contact and front contact and armature 6 of recycle relay 600, thence over the "new course" circuit which may be followed through back contact and armature 2 of RC1 relay 1013, through a circuit in the printer control circuit 630, a similar circuit in the ballistic data control circuit 609, a back contact on the SG2 relay 802 (which is equivalent to a recycle relay) in the interpolator control circuit, such back contact being here indicated by the dotted line circuit 700, thence to the armature 5 and front contact of the recycle relay 600, winding of the ST relay 606 to battery. If all parts of this circuit are closed, indicating normal operation, then the ST relay will operate. Upon the operation of the start relay a circuit will be closed from ground, armature 5 and front contact of ST relay 606, armature 7 and back contact of EC-1 relay 622, armature 4 and front contact of PF relay 405 and the winding of PF-1 relay 612 to battery. Relay 612 operates and locks independently of the PF relay 405 and closes ground to two leads 613 and 614 which lead into the problem data control circuit. The ground on conductor 613 will cause the operation of the recycle relay 1011 therein and the ground on conductor 614 will, after the recycle operation therein is complete, be extended to conductor 616 to cause the operation of the RTN relay 617.

Ground on conductor 613 operates RC relay 1011 and this relay now locks in a circuit from ground front contact and armature 7 of ST relay 606, conductor 624, back contact and armature 1 of NC relay 1014, back contact and armature 2 of ER-1 relay 1012, armature 2 and front contact of RC relay 1011, armature 1 and back contact of PNS relay 1015 to the winding of RC relay 1011. Relay 1011 causes the operation of RC-1 relay 1013 which closes one open point in the circuit from conductor 614 to conductor 616.

With all five of the relays 1001 to 1005, inclusive released as a result of the removal of ground from conductor 427 by the release of ST-1 relay 400, a down check circuit is closed from ground front contact and armature 8 of ST relay 606, armature 4 and back contact of ER relay 1010, and in series a back contact and armature of each of the relays 1005 to 1001, to the winding of GD relay 1006. GD relay 1006 operates GDA relay 1007 and this in turn operates GD-1 relay 1008. GD-1 relay 1008 closes a circuit from ground, front contact and armature 6 of ST relay 606, armature 1 and front contact of GD-1 relay 825 in the interpolator control circuit, circuit 608 in the ballistic control circuit 609, conductor 625, armature 1 and front contact of GD-1 relay 1008, conductor 401 to the ST-1 relay 400. ST-1 relay 400 operates and locks operated to ground at the front contact and armature 1 of ST relay 606. ST-1 relay 400 in operating replaces ground on conductor 427, whereupon the Z code which is still in the transmitter is again read off and the code responsive relays 1001 to 1004 reoperate accordingly. The reoperation of relays 1001 to 1004 will open the down-check circuit and restore relays 1006, 1007 and 1008, in turn. The GDA relay 1007 is slow in releasing to control the GD-1 relay 1008 to hold the circuit of the stepping magnet 1000 open for a short interval after the down-check circuit has been open. When the relays 1006, 1007 and 1008 are all released, a circuit may be traced from ground, armature 3 and back contact of GD relay 1006, armature 3 and back contact of GD-1 relay 1008, armature 2 and back contact of M relay 1009, armature 1 and front contact of A relay 1001 and thence through armature 6 and front contact of RC relay 1011 to operate ADV relay 1017. The operation of ADV relay 1017 in turn causes the operation of M relay 1009. M relay 1009 operates and locks to conductor 427 and causes the operation of stepping magnet 1000. M relay 1009 in operating also removes the ground on conductor 427 from the marking contacts of the problem data transmitter so that relays 1001 to 1004 will release and again close the down-check circuit to relays 1006, 1007 and 1008.

When stepping magnet 1000 is energized, the fingers of the problem data transmitter are withdrawn from the tape and the tape sprocket wheel rotates to advance the tape to the next code. When A relay 1001 releases as a result of the removal of ground from the marking contacts of the problem data transmitter, it opens the operating circuit for ADV relay 1017 which releases. When all of the relays 1001 through 1005 are released, a circuit may be traced from ground, front contact and armature 8 of ST relay 606, armature 4 and back contact of ER relay 1010 and in series a back contact and armature of each of the relays 1005 to 1001, through winding of GD relay 1006 to battery. GD relay 1006 operates and in turn operates GDA relay 1007. GDA relay 1007 in operating in turn operates GD-1 relay 1008. The operation of GD relay 1006 and GD-1 relay 1008 opens the locking circuit for M relay 1009 and relay 1009 releases. The release of M relay 1009 releases stepping magnet 1000 and restores the ground on conductor 427 to the marking contacts of the problem data transmitter. Upon the release of stepping magnet 1000, the fingers of the transmitter read the new code which has been advanced into the reading position and relays 1001 to 1005 operate accordingly.

It is a fact that in the tape such as that shown in Fig. 12 a Z code is followed in every instance by some one or another one hole code which will cause the operation of the M relay 1009. Let us assume in this case that the problem data tape has encountered the Z code following the 999 signal and that consequently the PN code is ready to be read off. Therefore, when ground is again restored to the conductor 427 by the release of M relay 1009, relay 1004 will become energized in response to the PN code. This will break the down check circuit and restore the relays 1006, 1007 and 1008 in turn. The GDA relay 1007 is slow releasing to control the GD-1 relay 1008 to hold the circuit of the stepping magnet 1000 open for a short interval after the down check circuit has been opened. When the relays 1006, 1007 and 1008 are all released, a circuit may be traced from ground armature 3 and back contact of GD relay 1006, armature 3 and back contact of GD-1 relay 1008, armature 2 and back contact of M relay 1009, the armature 1 and back contact of each of relays 1001, 1002 and 1003 and the front contact of relay 1004, conductor 1016, armature 7 and back contact of PN relay 843 in the interpolator control circuit, conductor 844, armature 3 and back contact of PNS relay 1015 and thence through armature 4 of the RC relay 1011 to operate the ADV relay 1017 to cause the operation of M relay 1009. Relay 1009 operates and locks to conductor 427 and causes the operation of the stepping magnet 1000. When stepping magnet 1000 is energized, the fingers of the problem data transmitter are withdrawn from the tape and the tape sprocket wheel rotates to advance the tape to the next code. Relay 1009 also opens the ground on conductor 427 to the marking contacts of the transmitter so that relay 1004 will release and again close the down check circuit to the relays 1006, 1007 and 1008. On the release of relay 1004 the original circuit for relay 1009 is opened but it is not until the operation of both relays 1006 and 1008 that relay 1009 is allowed to release. The release of M relay 1009 releases stepping magnet 1000 and the fingers of the transmitter read the next code which has been advanced into the reading position and the next code thereupon becomes effective. The PN relay 1018 operates in parallel with the ADV relay 1017 with results which will shortly be described. The PN relay does not lock at this time since its locking circuit is controlled by the RC relay 600 which is now operated.

The next code is an ER code—that is, a five-hole code whereupon all five of the relays 1001 to 1005 inclusive will respond. The down check circuit is again broken and in time all of the relays 1006, 1007 and 1008 will be returned to normal. The ER relay 1010 will respond to a series up check circuit controlled by the relays 1001 to 1005, inclusive. Now a circuit will be established from ground, armature 2 and back contact of GD relay 1006, armature 2 and back contact of GD-1 relay 1008, armature 1 and back contact of M relay 1009, armature 2 and front contact of ER relay 1010 and the winding of ER-1 relay 1012 to battery. The RC relay 1011 and the RC-1 relay 1013 are maintained energized from the ground on conductor 613 so that now the ground on conductor 614 will be closed through the armature 1 and front contact of ER-1 relay 1012 to conductor 616 to cause the operation of the RTN relay 617 in the master control circuit.

The operation of the RTN relay will insure that the master tape be returned to its start position and then started on its cycle of operations. The first code position on the master tape is a blank, from which position the master tape is advanced only when all of the various dependent circuits of the calculating device have "reported" back to the master control circuit that they are ready to go forward. The next "order" which the master or routine tape issues is one to determine and fix the class of operations which will be performed. Let it be assumed that the tape shown in Fig. 12, containing the observed coordinates is to be placed in the problem data transmitter and that the companion tape, that containing the correlated gun orders is to be placed in the interpolator transmitter. The order issued by the master tape is therefore to prepare for class 1 operations. It will be shown hereinafter that if such orders are issued and then the tapes in the problem data transmitter and the interpolator transmitter are reversed (as they should be for class 2 operations) then the device will block and an alarm will be brought in.

Now after this class information has been fixed, the master tape issues orders for the problem data transmitter to proceed. As a general description of this it may be noted that (in Fig. 5) a master code 05 will place a ground on the conductor 520 which among its functions will operate circuits (not shown here) which will place a ground (in Fig. 10) on the conductor leading to the M relay 1009 to advance the problem data tape. This will be more fully explained hereinafter.

The operation of the RTN relay 617 starts the return of the master or routine tape 414 to its starting point where the fingers of the transmitter will all reach their marking contacts through the perforations of a five-hole code. The operation of the ST-1 relay 400 heretofore described has allowed the PF relay 405 to release so that now a circuit may be traced from ground, armature 6 and back contact of EC-1 relay 622, armature 5 and front contact of RTN relay 617, back contact and armature 1 of PF relay 405, armature 2 and front contact of PF-1 relay 612, back contact and armature 3 of RTN-5 relay 406 the winding of RTN-2 relay 407 to battery. Relay 407 operates primarily to disconnect the transmitter fingers from their code responsive relays (in Fig. 5) and to connect them all to conductor 408. Through its armature 7, relay 407 extends ground through the normal contacts of armature 1 of RTN-4 relay 409 the winding of RTN-3 relay 410 to battery. Relay 410 operates and through its armature 1 places ground on the five transmitter spacing contacts so that as long as any single one of the transmitter fingers rests on a spacing contact a ground will be found on conductor 408 to lock RTN-3 relay 410 in its operated position in a circuit which will shortly appear. Relay 410, through its armature 2 extends ground to armature 2, back contact and the right-hand terminal of RTN-5 relay 406 and thence to the winding of RTN-4 relay 409. As long as ground is maintained on this armature 2 of relay 406, relay 406 cannot operate. Relay RTN-4 operates and in addition to closing the locking circuit for RTN-3 relay 410, extends ground from armature 2 of RTN relay 617 through front contact and armature 5 of relay 409 to the left-hand terminal of RTN-5 relay 406. Thus, it will be seen that in the following movement of the tape, ground will be maintained on the transmitter spacing contacts until a five hole code is found, whereupon RTN-3 relay 410 will release and RTN-5 relay 406 will operate in series with RTN-4 relay 409.

Now it may be noted that through its armature 1 the RTN relay 617 extends ground over the normal contacts of armature 4 of RTN-5 relay 406, back contact and armature 1 of D-RTN relay 621 to the winding of reverse magnet 411. It is believed to be clear from the drawing that the operation of magnet 411 will cause the right-hand pawl of the ratchet 412 to engage a ratchet wheel which will turn the shaft 413 in a reverse (clockwise) direction (under control of the lever

17

415) to move the tape 414 in a reverse direction.

During the operation of RTN-4 relay 409 and before relay 406 is operated, a ground may be traced from the front contact and armature 3 of RTN-3 relay 410, the armature 1 and back contact of RTN-5 relay 406, front contact and armature 2 of RTN-4 relay 409, conductor 416, winding of tape stop magnet 417 to battery. Magnet 417 operates, removes the stop from the cam 418 and allows the transmitter to start a continuous operation under control of the motor 419, thus moving the tape 414 continuously until a five-hole code (several of which are recorded in the tape at the starting position) is encountered. At this time, ground being removed from conductor 408, relay 410 will release, relay 406 will operate in series with relay 409 and the circuit of the stop magnet 417 will be interrupted so that the transmitter will come to rest with all five of its fingers on a marking contact. The operation of relay 406 interrupts both the operating and locking circuits for relay 407 and relay 407 releases. The operation of relay 406 also releases reverse magnet 411. Ground may then be traced from armature 1 and front contact of RTN relay 617, front contact and armature 4 of RTN-5 relay 406, back contact and armature 1 of STP relay 420, back contact and armature 1 of M relay 421, to the marking contacts of the master tape transmitter.

In the normal operation of the master tape transmitter this ground connection is provided so that when the tens digit of a master code is encountered the relays 501 to 505 will be operated. The right-hand armatures of these relays control two circuits, one to operate the master code relays represented by relays 506, 507 and 508 and another which will indicate that three and three only of these relays have operated. If anything other than three and three only are operated then conductor 500 will be grounded and the master control circuit will be recycled. The only exception to this is when all five of the relays are simultaneously released or operated.

Now after the master tape has been moved until a five-hole code has been encountered so that through the loss of ground on conductor 409, relay 410 is released, RTN-5 relay 406 will operate in series with RTN-4 relay 409 and these relays will remain in this condition until RTN relay 617 is released. The operation of RTN-5 relay 406 releases RTN-2 relay 407 and connects the transmitter fingers to the tens relays 501 to 505 inclusive. Since ground is now extended to the marking contacts, all five of these relays will now operate (and lock to ground on armature 3 of ST relay 606) so that a chain circuit from ground will be closed to conductor 521 to operate the "end-of-cycle" EC relay 628. This relay operates and locks through armature 4 and back contact of the STP relay 420. The EC relay 628 establishes a circuit from ground, armature 4 and front contact of relay 628, a circuit 629 in the printer control circuit 630 (which is closed only when and if the control circuit is in proper order) the winding of EC-1 relay 622 to battery. Relay 622 operates, and by movement of its armature 7, opens the locking circuit of PF-1 relay 612 whereby ground is removed from conductors 613 and 614. As a consequence the RC relay 1011 in the problem data circuit is released and the RTN relay 617 in the master control circuit is released. The release of RC relay 1011 releases RC-1 relay 1013. The release of relay 617 releases relays 406 and 409. The operation of EC-1 relay also releases the RC relay 600.

18

The movement of armature 6 of EC-1 relay 622 opens the locking circuit 518 for the code relays so that if when this recycle operation takes place any one of these relays is in operated position it will be released.

Upon the operation of any one of relays 501 to 505 a ground is placed on conductor 509 so that as soon as RTN relay 617 returns to normal a circuit will be extended from this conductor 509 through armature 4 and back contact of RTN-4 relay 409, armature 3 and back contact of RTN relay 617, back contact and armature 2 of TS-1 relay 422, armature 1 and back contact of GD relay 620, the winding of TS relay 423 to battery, whereupon the TS relay 423 operates.

The M relay 421 is now operated in a circuit from ground, armature 2 and front contact of ST-1 relay 400, armature 5 and front contact of TS relay 423, back contact and armature 1 of TS-1 relay 422, winding of M relay 421 to battery. Relay 421 opens the ground to the marking contacts of the transmitter and through its armature 3 and the armature 1 of the STP-1 relay 426 places a ground on conductor 416 to step the tap along one step. The ground on conductor 416 causes the operation of tape stop magnet 417. Magnet 417 operates and removes the stop from cam 418 which allows the transmitter to start operation under control of motor 419 to move tape 414 in a forward direction. During the first step of this movement auxiliary contacts 437 close and cause the operation of STP-1 relay 426 which locks to ground at front contact and armature 3 of M relay 421. The operation of STP-1 relay 426 removes ground from conductor 416 and releases stop magnet 417. Therefore, tape 414 will come to rest after having taken one step in the forward direction to the next code in the master tape which follows the 5-hole ER code.

A circuit is now established from ground, armature 2 and back contact of RTN relay 617, front contact and armature 2 of M relay 421, the winding of TF relay 425 to battery, resulting in the operation of the relay 425 and the transfer of the fingers of the transmitter from the tens relays to the units relays. A circuit may now be traced from ground, front contact and armature 2 of TSL relay 424 (this relay has responded to ground on armature 3 of EC-1 relay 622 since no one of the code relays 506 to 508 will respond to a five-hole code) armature 3 and auxiliary front contact of TS relay 423, front contact and armature 1 of TSL relay 424, front contact and armature 6 of relay 423, front contact and armature 4 of STP-1 relay 426, normal contacts of armature 3 of TS-1 relay 422, through the down-check circuit of the units relays 511 to 515 inclusive, conductor 516, front contact and armature 8 of TF relay 425, winding of GD relay 620 to battery. Relay 620 responds and opens the locking circuit for the tens relays, thus allowing these relays to release and remove ground from both conductors 509 and 521. The original circuit for the EC relay 628 is thus opened but this relay is now held locked by the STP relay 420. The loss of ground on conductor 509 removes ground from the back contact of armature 2 of TS-1 relay 422 and consequently this relay now operates in series with the TS relay 423 whereupon GD relay 620 is released. The operation of TS relay 422 opens the operating circuit for M relay 421 which releases. The release of M relay 421 opens the locking circuit for STP-1 relay 426 which releases.

The STP relay 420 now responds in a circuit from ground, armature 4 and front contact of TS-1 relay 422, armature 8 and front contact of EC-1 relay 622, armature 6 and back contact of RTN relay 617, back contact and armature 6 of RC relay 600, the NC (new course) circuit including back contact and armature 2 of RC-1 relay 1013 in the problem data circuit thence through similar guard circuits in the printer control circuit 630, the ballistic control circuit 609 and the interpolator control circuit to the armature 5 and back contact of RC relay 600, thence over conductor 623 and the winding of step relay 420 to battery. Relay 420 responds and locks to the ground on armature 7 of TF relay 425. After the operation of STP relay 420, a circuit may be traced from ground, front contact and armature 3 of STP relay 420, back contact and armature 1 of STP-1 relay 426, conductor 416, through the winding of stop magnet 417 to battery. Magnet 417 operates and removes the stop from cam 418 which allows the transmitter to start operation under control of motor 419 to move tape 414 in a forward direction. During the first step of this movement auxiliary contacts 437 close and cause the operation of STP-1 relay 426. STP-1 relay 426 locks operated to ground at front contact and armature 3 of STP relay 420. STP-1 relay 426 in operating removes the ground from conductor 416 which releases stop magnet 417. The release of stop magnet 417 causes the transmitter to stop at the next code position where the fingers of the transmitter engage in next set of perforations. Thus the transmitter has moved the tape one step to the next code position in response to the closure of the NC circuit and regardless of whether the units relays are all operated by another five-hole code or are all released by a blank code.

Now the release of RTN relay 617 has opened the circuit for RTN-4 relay 409 and RTN-5 relay 406 so that these relays are not now operated. With the operation of STP relay 420 the locking circuit for the EC relay 628 is opened and this relay releases, in turn releasing EC-1 relay 622. Upon the release of relay 622 the TSL relay 424 is released and this is followed by the release of relays 425, 423 and 422. Following the release of TF relay 425 the STP relay 420 releases and this in turn opens the locking circuit of the STP-1 relay 426 so that this relay returns to normal.

It may be noted that during this one step movement the circuit of the reverse magnet 411 was held open by the release of the RTN relay 617, so that regardless of the direction in which the tape had moved in its continuous movement until the five-hole code was found, it now steps forwardly one step at a time. If the tape had moved forwardly on its return then the code which stopped such movement would be one of several successive five-hole codes so that the new code which would be read off into the units relays would be another five-hole code. On the other hand, if the tape had been moving backwardly, then this one step forward would have brought the transmitter fingers to a blank as a consequence of which no one of the relays 511 to 515 would have been operated. Thus as soon as the continuous movement of the tape is stopped by the encounter with a five-hole code, that particular five-hole code is read off into the tens relays 501 to 505 and the following code in a forward direction is read into the units relays (without effect). Only when the NC circuit is complete is the tape again stepped (one step) forwardly. If the continuous movement had been backwardly then the tape would have reached a blank code (known as the priming position since it awaits the closure of the NC circuit) so that when the step from that position is taken the tens code of the first master coded order is placed in position to be read.

It may be noted that if the recycle occurs before the midpoint of the tape is reached then the reverse magnet will be operated and the return of the tape will be backwardly. On the other hand the code 21 is recorded at the midpoint of the tape so that if such midpoint is reached by the time the recycle occurs, then the code wire 517 will have been grounded to operate the D-RTN relay 621 and since this opens the circuit of the reverse magnet 411 the return of the tape will be forwardly.

Let us assume that the movement of the tape has been forwardly and that a series of the ER (five-hole) codes have been encountered. The code now to be read will be another one which will cause all five of the relays 501 to 505 to be operated. Again both conductors 509 and 521 will be grounded, the TS relay 423 will operate and close the circuit for the M relay 421 which in turn will place a ground on conductor 416 to the winding of stop magnet 417 and operate TF relay 425. Stop magnet 417 again operates and removes the stop from cam 418 which allows tape 414 to start a forward movement under control of motor 419. During the first step of this movement auxiliary contacts 437 will close and cause the operation of STP-1 relay 426 which removes the ground from conductor 416 and stops the tape movement at the next succeeding code position. Relay 620 operates and removes ground from conductors 509 and 521 and TS-1 relay 422 operates in series with TS relay 423. TS-1 relay 422 in operating releases M relay 421 which in turn releases STP-1 relay 426. If the NC circuit is closed indicating that the proper starting conditions are present in the other circuits, a circuit will be closed for the operation of STP relay 420. STP relay 420 in operating places a ground on conductor 416 to operate stop magnet 417. Stop magnet 417 again operates and removes the stop from cam 418 which allows tape 414 to start a forward motion under control of motor 419. During the first step of this movement, auxiliary contacts 437 will close and operate STP-1 relay 426 which removes the ground from conductor 416 and stops the tape movement at the next succeeding code position. Upon the operation of STP relay 420, EC relay 628 releases and in turn releases EC-1 relay 622, the release of EC-1 relay 622 releases TSL relay 424 which is followed by the release of relays 425, 423 and 422. The release of relay 425 causes the release of relays 420 and 426. It will therefore be observed that the master control tape 414 will be moved forwardly two steps whenever the tens relays 501—505 are operated in response to a reading of a 5-hole code; one step in response to the reading of the 5-hole code and the second step in response to the completion of the NC circuit. This operation is repeated until the blank code following the last five-hole code is passed and the tens code of the first master order is placed in position to be read. Therefore in response to the last 5-hole code read from the tape, the tape is moved one step to the blank code and then in response to the completion of the NC circuit it is moved one additional step to the first master order recorded in the master tape.

It should be noted that there must be an uneven number of ER (five-hole code) signals recorded in the master tape so that the blank code will always be read off into the units relays. The usual practice is to have one such signal but any other uneven number will cause proper operation or any even number will do, provided there is a blank or some other code between them so that the total is always divisible by two. By this arrangement, so long as there is an ER signal to be read off into the tens relays, it is immaterial what code is read off into the units relays for it is in response to the completion of the NC circuit that the transmitter is caused to advance regardless of the operation of any one or more of the units relays 511 to 515.

Under normal conditions the following operation is one in which the class relays are operated by the reading off of the proper master code. The tens digit is a three-hole code and results in the operation of one of the relays 506, 507 and 508. Should any other than a three-hole code be read off at this time conductor 500 would be grounded and as soon as the TS relay 423 is operated the recycle relay would be operated. The units digit is a two-hole code and results in the grounding of a particular circuit through one of the armatures of that one of the relays 506 to 508 which has been operated. Should any other than a two-hole code be read off at this time conductor 691 to the recycle relay would be directly grounded.

The class relays are not shown here but the action is similar to that of the D-RTN relay 621. When this relay is operated through the grounding of conductor 517 (master code 21) and its operation is assured, a satisfaction signal is sent in the form of an extension of ground on conductor 517 through the front contact and armature 3 of D-RTN relay 621 to the step conductor 623 which causes the STP relay 420 to operate.

The following master code 05 will cause the grounding of conductor 520, which as hereinbefore stated will reach the step conductor 1019 of the problem data control circuit to cause the operation of the M relay 1009 therein. This will start the problem data transmitter, which will then read off the problem number into a storage register and come to rest on the following Z code. This number, read off into a storage register, is transferred to a three-digit adder so that when the interpolator tape now reads off its problem number into this three-digit adder, the two numbers are compared. If the two numbers do not correspond the tape in the interpolator transmitter will be moved to the next higher or lower number until correspondence is reached. At that time the Z code, on which the problem data transmitter is resting, will become effective and the device will again be recycled. This time the identification data as indicated in Fig. 12 will be read off into the printer control circuit to be printed.

It may be briefly noted here that ST-4 relay 603 controls starting grounds into the interpolator circuit. The ground on conductor 610 controls the SG-2 relay 802 and the ground on conductor 611 controls the SG-1 relay 818. When both relays are released the interpolator control circuit returns entirely to normal. When the SG-2 relay 802 is released, through the result of some calculation in the three digit adder the interpolator circuit is recycled, the three digit adder is returned to normal and another comparison of two three digit numbers is made. This will shortly be described in more detail.

When, as hereinbefore described, the problem data circuit in Fig. 10 has caused the operation of the recycle relay 600 in the master control circuit, the ST relay 606, the ST-4 relay 603 and the ST-1 relay 400 are released, and this in turn causes the release of the SG-1 relay 818 and the SG-2 relay 802 in the interpolator circuit whereby this circuit will be completely released. Upon the subsequent reoperation of the ST relay 606 ground will be extended from the front contact and armature 1 of relay 606, conductor 602, armature 1 and back contact of LTS relay 822 conductor 845, the down check circuit of the interpolator transmitter relays 711 to 715 inclusive, conductor 717, winding of GD relay 824 to battery. If the relays 711 to 715 are properly released the GD relay will operate and cause the operation of the GD-1 relay 825 for checking purposes hereinbefore explained for the operation of the ST-1 relay 400 in the master control circuit. Upon the operation of this relay 400 and subsequently on the operation of ST-4 relay 603 after the release of RC relay 600 and EC relay 622, a circuit is completed from ground, armature 1 and front contact thereof, conductor 610, back contact and armature 1 of OHC (one hole code) relay 900, armature 1 and back contact of TAB relay 901, armature 1 and back contact of TAA relay 902, the winding of SG-2 relay 802 to battery. This relay supplies a number of ground connections on which the interpolator control circuit depends and which when temporarily opened will cause the recycle of this circuit. Ground is also supplied from armature 2 of ST-4 relay 603 over conductor 611 for the operation of SG-1 relay 818. It will be noted that relay 818 cannot operate until after relay 802 has operated but after operation it locks in to the ground from the ST-4 relay 603 in the master control circuit and becomes independent of the SG-2 relay 802. For a complete release of the interpolator control circuit both relays SG-1 and SG-2 must release—in other words the ST-4 relay 603 must release.

The operation of the SG-2 relay 802, starts an automatic movement of the interpolator tape transmitter to find a five hole code. A circuit is established from ground, armature 3 and front contact of SG-2 relay 802, armature 1 and back contact of HSC relay 803, conductor 804, the back contacts and each of armatures 1, 2, 3, 4 and 5 of PPA relay 701, any one or more of the transmitter fingers resting on its spacing contact, conductor 702, armature 2 and back contact of STC relay 805, armature 1 and back contact of PPD relay 806, armature 1 and back contact of PPH relay 807, winding of PPB relay 808 to battery. Relay 808 operates and closes an operating circuit for PPC relay 811 through both its armatures 1 and 2 which thereupon operates and locks independently of relay 808. The PPB relay also applies ground to the upper terminal of the PPE relay 810 so that it cannot be operated when immediately thereafter the PPC relay 811 applies ground to the lower terminal thereof. It will be noted that hereinafter when the PPB relay 808 releases the PPC relay will maintain the ground on the lower terminal of the PPE relay 810 while the PPB relay removes ground from the upper terminal thereof so that PPE relay 810 will operate.

If at this time a five hole code is effective in the interpolator transmitter the PPB relay 808 will not operate and nothing further will happen in the interpolator circuit until orders have been received from the master control circuit. However, if anything else than a five hole code is present in the interpolator tape transmitter then the circuit for relay PPB as described will be closed. In response to the operation of PPC relay 811 a circuit is established from ground, armature 2 and front contact of relay 811, armature 2 and back contact of PPH relay 807, back contact and armature 2 of PPF relay 812 lower winding of PPD relay 806 to battery. Relay PPD operates and locks to the ground from the fingers of the tape transmitter so that this relay will now be holding in a circuit which will only be opened when a five hole code is encountered and no one of the fingers rests on a spacing contact. The operation of PPD relay 806 releases the PPB relay 808, whereupon the PPE relay 810 operates. This causes the operation of the PPH relay 807 to permanently open the circuit of the PPB relay 808 and to open the original circuit for PPD relay 806 leaving this relay dependent on the code transmitter tape alone. The circuit for the operation of PPH relay 807 is from ground, the front contact and armature of PPE relay 810, armature 2 and back contact of TA-RV relay 813, the winding of PPH relay 807 to battery.

Upon the operation of PPH relay 807 a circuit is established from ground, armature 1 and back contact of TA-RV relay 813, armature 3 and front contact of PPH relay 807, armature 2 and front contact of PPD relay 806, back contact and armature 3 of STC relay 805, conductor 814, winding of stop magnet 703 to battery. Now the mechanism of the interpolator tape transmitter is like that of the master tape transmitter shown in Fig. 4, so it will be understood that with the operation of the stop magnet 703 the tape will be moved from code to code and in this case the movement will be continuous until a five hole code is found. The movement of the tape with the stop magnet 703 alone operated will be forwardly, but with the reverse magnet 716 simultaneously operated will be backwardly. Since the circuit has been described as with relay TA-RV normal the reverse magnet 716 will not be operated at present and so the tape will move forwardly.

Now let it be assumed that a five hole code is encountered. Simultaneously all five transmitter fingers will be lifted off their spacing contacts and hence the PPD relay 806 will release. The movement of the armature 2 of this relay opens the circuit of the stop magnet 703 and transfers the ground thereon through the front contact and armature 4 of the PPH relay 807, the winding of LTS relay 822 to battery thus operating this relay. The LTS relay 822 opens the connection between conductors 602 and 845 and thus releases the GD relay 824 and in turn the GD-1 relay 825. Thereupon a circuit is established from ground, back contact and armature 4 of the ADV relay 826, armature 4 and back contact of GD relay 824, armature 3 and back contact of GD-1 relay 825, armature 2 and front contact of LTS relay 822, winding of LTS-1 relay 823. Relay 823 operates and locks to ground on armature 2 of SG-2 relay 802, but produces no other operation at present since it has been assumed that this action has taken place upon the recycle of the master control circuit and as soon as the ST and ST-1 relays have operated but before the master control circuit has issued any orders to the interpolator control circuit.

We have assumed that the problem data tape has passed over the 999 code and had then encountered the Z code which caused the recycle operation in the master control circuit. Thereafter upon the operation of the ST relay 606 the recycle relays in the problem data circuit had operated and the problem data transmitter had started to operate. The PN code had been encountered and had resulted in the advance of this tape. While the PN relay 1018 was also operated it was not locked so that now the problem data circuit is in the condition where the transmitter fingers are resting on a five hole code, the ER relay 1010 and the ER-1 relay 1012 are operated. In the interpolator control circuit the tape has moved until a five hole code has been found and that transmitter is likewise resting at such a point. Conditions are now proper for the sending of the first order from the master control circuit.

No further operations in the master control circuit will herein be described for throughout the ensuing operations no changes take place other than the periodic operation of the STP and STP-1 relays when the successful completion of an order is received. Each order consists of the selected operation of the tens relays and then the units relays of Fig. 5 to cause the selective grounding of some one of the code wires extending therefrom. The first order issued is (code 88) one to set the class relays which operate, lock up and return a satisfaction signal which will cause the operation of the STP relay to prepare for the next order.

This next order, in accordance with a typical example set forth in detail in said Andrews-Vibbard application, is (code 05) one to ground the PD-TQZ lead 520. This ground may be traced into the problem data circuit to the back contact and armature 5 of the RC-1 relay 1013, front contact and armature 4 of ER-1 relay 1012, to the winding of T relay 1100 and thence to battery. Relay 1100 operates and through its armatures 3 and 4 locks to the armature 5 of the RC-1 relay 1013 independently of the ER-1 relay 1012. The operation of the T relay 1100 operates the X0 relay 1101 and extends the steering chain start circuit from the V relay 1102 to the winding of the U relay 1103. The X0 relay 1101 in operating grounds three pairs of biquinary leads marked X0 and X00, Y0, Y00, Z0 and Z00 which are extended to the respective biquinary leads in the decimal denominational orders U to Z respectively in the C multiple 1107. These grounds on leads X0, X00, Y0, Y00, Z0 and Z00 will set the X, Y and Z orders of the T register 1104 to zero. The operation of T relay 1100 also closes a circuit from ground, back contact and armature 4 of ADV relay 1017, conductor 1121, front contact and armature 7 of T relay 1100, conductor 1122 to T register 1104. The ground thus applied on conductor 1122 operates the cut-in relay of the T register 1104 and prepares the T register for receiving and registering the three digits of the problem number. When the circuits of the T register are in condition and ready to accept a new registration, a ground will be applied to conductor 1123 which is extended through front contact and armature 5 of T relay 1100 to start lead 1105. It should be noted that the chain start circuit for the steering chain relays of Fig. 11 is normally traced through normal contacts of armature 3 of V relay 1102, back contact and armature 2 of T relay 1100 to the winding of V relay 1102. However, the operation of T relay 1100 transfers the chain start lead 1105 to the winding of U relay 1103 so that the operation of T relay 1100 transfers the starting point of the steering chain from V relay 1102 to U relay 1103 so as to start setting the first digit of the problem number in the U order of the T register 1104. With the T register 1104 in condition to receive a registration a ground therefrom over conductor 1123 will be extended over the front contact and armature 5 of the T relay 1100, conductor 1105, the chain start circuit to the winding of the U relay 1103 whereupon this relay operates. It may be noted that the function of the PD–TQZ lead 520 is to order a reading of the problem data tape. In the present instance where the problem data tape transmitter is resting on the first ER code after the first PN code the new course number will be the first data read into the T register. Later the time block number will be read into the T register, the quadrant elevation number will be read into the Q register and the range number will be read into the Z register. Upon the operation of the U relay 1103, a circuit will be established from ground, front contact and armature 3 of ER–1 relay 1012, conductor 1020, front contact and armature 2 of X0 relay 1101, front contact and armature 4 of U relay 1103, back contact and armature 5 of NC–2 relay 1106, conductor 1116, back contact and armature 3 of NC relay 1014, conductor 1019 winding of M relay 1009 to battery. Relay 1009 operates and operates stepping magnet 1000 as described hereinbefore to step the problem data transmitter tape to its next code. This being another ER code the operation will be repeated and the tape will again be stepped forward to the following code which in this case is PN. It may be noted that the ER code is in most instances duplicated. This is for several reasons among which may be noted that one which has to do with the effective connection of the problem data tape to a printer. The ER code transmitted to the printer will cause a carriage return and the line feed operation therein, and since the circuits with which we are dealing are considerably faster in operation than the conventional printer a minimum of two such ER codes is used to insure the satisfactory completion of the carriage return and line feed operations. There are other reasons which appear in the complete disclosure in the said Andrews-Vibbard application.

Following the starting of the problem data transmitter and the reading of a second ER code the PN code is encountered. D relay 1004 will operate in response to this PN code. The operation of D relay 1004 will open the down-check circuit and restore relays 1006, 1007 and 1008 in turn. When GD relay 1006, GDA relay 1007 and GD–1 relay 1008 have all released, a circuit may be traced from ground, armature 3 and back contact of GD relay 1006, armature 3 and back contact of GD–1 relay 1008, armature 2 and back contact of M relay 1009, armatures 1 and back contacts of relays 1001, 1002 and 1003, armature 1 and front contact of D relay 1004, PN conductor 1016, armature 7 and back contact of relay 343, conductor 844, armature 3 and back contact of PNS relay 1015 to operate the PN relay 1018 which now locks to a ground supplied by armature 3 of ST–4 relay 603. The PN relay 1018 grounds conductor 1021 to operate the PN relay 843 in the interpolator control circuit and this relay signals its satisfactory operation by transferring the ground for the original operation of the PN relay 1018 from conductor 844 to conductor 1019. Conductor 1019 is the step conductor for the problem data control circuit and leads to the M relay 1009 operating this relay. M relay 1009 in operating, operates stepping magnet 1000 as described hereinbefore which steps the tape in the problem data transmitter to the next code position. The next code position in the problem data tape is the code position representing the first digit of the problem number. The three digits of this problem number (100 as shown in the tape Fig. 12) are then read off a digit at a time over the C multiple 1107 into the T register 1104 from which they are transferred over conductors in cable 1108 into the addend element 903 of the three digit adder. Upon the operation of U relay 1103 as above-described, the companion U–1 relay 1110 will operate. The operation of U–1 relay 1110 will connect the seven biquinary leads from the translator relays of Fig. 10 to the seven biquinary leads in the U order of the C multiple 1107 which extends to the T register 1104. Because the transmitter fingers of the problem data transmitter are now resting at the code position for the first digit of the problem number (digit 1 as shown in the tape of Fig. 12), the biquinary representation of the digit will be registered in the U order of the T register 1104. The operation of relays 1001, 1002 and 1004 of the problem data translator in response to the reading of the code of the first digit of the problem number will open the down-check circuit and release relays 1006, 1007 and 1008 in turn as described hereinbefore. The release of GD relay 1006 closes a circuit for the operation of ST relay 1111 which may be traced from ground, armature 6 and front contact of ST–1 relay 400, back contact and armature 5 of GD relay 1006 through the winding of ST relay 1111 to battery thus operating ST relay 1111. When the registration of the first digit of the three digit number comprising the problem number is properly received and registered in the U order of T register 1104, the up-check circuit thereof will apply a ground to the UU lead in cable 1112. A circuit may now be traced from ground on the UU lead of cable 1112, through front contact and armature 3 of U–1 relay 1110, front contact and armature 2 of ST relay 1111, through the winding of STP relay 1113 to battery, thus operating STP relay 1113. STP relay 1113, known as the steering-chain step relay, in operating will operate V relay 1102 over a circuit extending from ground now connected to armature 2 of U relay 1103, front contact and armature 2 of STP relay 1113, front contact and armature 3 of U relay 1103 through the winding of V relay 1102 to battery. Upon the operation of V relay 1102 a circuit may be traced from ground, armature 5 and front contact of U–1 relay 1110, armature 1 and front contact of V relay 1102, conductor 1116, back contact and armature 3 of NC relay 1014, STP lead 1019 through the winding of M relay 1009 to battery, thus operating M relay 1009. M relay 1009 in operating, operates stepping magnet 1000 as described hereinbefore which steps the tape in the problem data transmitter to the next code which is the code position for the second digit of the problem number. The operation of M relay 1009 removes ground on conductor 427 from the marking contacts of the problem data transmitter which releases relays 1001, 1002 and 1004. The release of relays 1001, 1002 and 1004 restores the down-check circuit in the translator and relays 1006, 1007 and 1008 operate in turn. The operation of GD relay 1006 releases ST relay 1111. The release of ST relay 1111 releases STP relay 1113 which in turn releases U relay 1103. U relay 1103 in releasing in turn releases U-1 relay 1110. The release of U-1 relay 1110 opens the operating circuit to the M relay 1009 and the operation of GD relay 1006 and GD-1 relay 1008 opens the locking circuit for M relay 1009 and allows M relay 1009 to release. The release of M relay 1009 reconnects ground on conductor 427 to the marking contacts of the problem data transmitter. Upon the release of U-1 relay 1110 a circuit is established from ground, armature 4 and back contact of U-1 relay 1110, armature 2 and front contact of V relay 1102 through the winding of V-1 relay 1114 to battery, thus operating V-1 relay 1114. The operation of V-1 relay 1114 will connect the seven biquinary leads from the transmitter relays of Fig. 10 to the seven biquinary leads in the V order of the C multiple 1107 which extends to the T register 1104.

Upon the registering of the second digit of the problem number in the V order of the T register 1104 in the manner described hereinbefore, the V order up-check circuit in T register 1104 is operated and will apply a ground to the UV lead in cable 1112. Ground on lead UV in cable 1112 is extended through front contact and armature 3 of V-1 relay 1114, front contact and armature 2 of ST relay 1111 (ST relay 1111 having operated when GD relay 1006 released in response to the opening of the translator down-check circuit by the operation of relays 1001, 1002 and 1003 in the translator of Fig. 10), through the winding of STP relay 1113 to battery, thus operating STP relay 1113. STP relay 1113 in operating will advance the chain start circuit and cause the operation of W relay 1115. The circuit for the operation of W relay 1115 may be traced from ground on the chain start lead 1105 through front contact and armature 4 of V relay 1102, back contact and armature 2 of U relay 1103, front contact and armature 2 of STP relay 1113, back contact and armature 3 of U relay 1103, front contact and armature 5 of V relay 1102 through the winding of W relay 1115 to battery.

Upon the operation of W relay 1115 a circuit may be traced from ground, armature 5 and front contact of V-1 relay 1114, front contact and armature 1 of W relay 1115, conductor 1116, back contact and armature 3 of NC relay 1014, STP lead 1019 to the winding of M relay 1009. M relay 1009 operates and as described above, operates stepping magnet 1000 as hereinbefore described which steps the tape in the problem data transmitter to the next code position which is the code position for the third digit of the problem number. The operation of M relay 1009 removes ground on conductor 427 from the marking contacts of the problem data transmitter which will release relays 1001, 1002 and 1003. Release of relays 1001, 1002 and 1003 will reclose the down-check circuit in the translator and relays 1006, 1007 and 1008 will operate in turn. The operation of GD relay 1006 releases ST relay 1111, the release of ST relay 1111 releases STP relay 1113 which in turn releases V relay 1102, V relay 1002 in releasing in turn releases V-1 relay 1114. The release of V-1 relay 1114 opens the operating circuit to the M relay 1009 and the operation of GD relay 1006 and GD-1 relay 1008 opens the locking circuit for M relay 1009 and allows M relay 1009 to release. The release of M relay 1009 will reconnect ground on conductor 427 to the marking contacts of the problem data transmitter. Upon the release of V-1 relay 1114 a circuit is established from ground, armature 4 and back contact of U-1 relay 1110, armature 4 and back contact of V-1 relay 1114, armature 3 and front contact of W relay 1115 through the winding of W-1 relay 1117 to battery, thus operating W-1 relay 1117. The operation of W-1 relay 1117 will connect the seven biquinary leads from the translator relays of Fig. 10 to the seven biquinary leads in the W order of the C multiple 1107 which extends to the T register 1104.

Upon the registering of the third and last digit of the problem number in the W order of the T register 1104 in the manner described hereinbefore, the W order up-check in the T register 1104 is operated and will supply a ground to the UW lead in cable 1112. Ground on lead UW in cable 1112 is extended through front contact and armature 3 of W-1 relay 1117, front contact and armature 2 of ST relay 1111 (ST relay 1111 having reoperated when GD relay 1006 released in response to the opening of the translator down-check circuit by the operation of relays 1001, 1002 and 1003), through the winding of STP relay 1113 to battery, thus operating STP relay 1113. Upon the registering of the third and last digit of the problem number in the W order of the T register 1104 in the manner described hereinbefore, the up-check circuit for the T register is completed because, as described above, the X, Y and Z orders of T register 1104 have been set to zero by the operation of X0 relay 1101. With the up-check circuit of T register 1104 closed, a ground will be applied to step lead 1118. This ground is extended from step lead 1118 through front contact and armature 6 of T relay 1100, conductor 1119, through the winding of ADV relay 1017 to battery, thus operating ADV relay 1017. ADV relay 1017 locks operated in a circuit which may be traced through front contact and armature 2 of ADV relay 1017, conductor 1120 to ground through front contact and armature 1 of ST relay 1111, to ground through front contact and armature 1 of STP relay 1113, and to ground through front contact and armature 6 of W-1 relay 1117. ADV relay 1017 in operating applies ground to step conductor 1019 which extends through the winding of M relay 1009 to battery. M relay 1009 in operating operates stepping magnet 1000 as described hereinbefore which steps the tape in the problem data transmitter to the next code which is a Z or recycle code. The operation of M relay 1009 removes ground on conductor 427 from the marking contacts of the problem data transmitter which causes the release of relays 1001, 1002 and 1003. The release of relays 1001, 1002 and 1003 will close the down-check circuit in the translator and relays 1006, 1007 and 1008 operate in turn. The operation of GD relay 1006 and GD-1 relay 1008 opens the locking circuit of M relay 1009, however, M relay 1009 is still held operated over its operating circuit from ADV relay 1017. The operation of ADV relay 1017 removes the ground from conductor 1121 when armature 4 of ADV relay 1017 moves. The removal of this ground from conductor 1121 which extends through front contact and armature 7 of T relay 1100 over conductor 1122 to the T register 1104 will cause the release of the cut-in relays in T register 1104. The release of the cut-in relays in T register 1104 will remove ground from conductor 1123 which extends through armature 5 and front contact of T relay 1100 to start conductor 1105. The removal of ground from start lead 1105 will cause the release of W relay 1115. The release of W relay 1115 will release W-1 relay 1117 which will remove one of the three holding grounds from conductor 1120 leading to the ADV relay 1017. The release of W-1 relay 1117 will in turn release STP relay 1113 and STP relay 1113 in releasing will remove the second of the holding grounds from conductor 1120 leading to ADV relay 1017. The operation of GD-1 relay 1006 after the release of relays 1001, 1002 and 1003 opens the operating circuit for ST relay 1111 which releases and removes the third holding ground from conductor 1120. Because all three of the holding grounds have been removed from conductor 1120, ADV relay 1017 releases and opens the operating circuit for M relay 1009. M relay 1009 may now release and in so doing it reconnects ground on conductor 427 to the marking contacts of the problem data transmitter.

The code in the problem data tape which is now at the reading position of the problem data transmitter is the Z or recycle code (as shown in the tape of Fig. 12) and code relays 1001, 1002, 1003 and 1004 will operate as described hereinbefore. This code, however, does not become effective at the present time to initiate a recycle operation of the master control circuit because the circuit tracing backward from the winding of the RC relay 600 extends over conductor 601, back contact and armature 4 of RC-1 relay 1013, armature 3 and back contact of ER relay 1010, the front contact and armature 2 of each of the code relays 1004, 1003, 1002 and 1001, armature 3 and front contact of PN relay 1018, conductor 1022, front contact and armature 6 of PN relay 843, and thence through a circuit here indicated by dotted lines to the front contact of armature 3 of this same PN relay 843 to ground. The dotted lines between armature 6 and the front contact of armature 3 represent essentially a circuit which will be closed only when the sum produced in the sum element 905 of the three digit adder contains three zeros indicating that the number described as having been transmitted to the addend element 903 is matched by its counterpart now searched for in the interpolator tape. In other words, the problem data tape has established a condition and has then gone to a Z code and will camp there until this established condition is properly fulfilled. We may now turn to the interpolator control circuit.

It will be remembered that when the master control circuit was recycled that the interpolator transmitter was operated until a five hole code was found whereupon the operation stopped with the fingers on such five hold code and the LTS relay 822 operated. Now upon the operation of the PN relay 843 the operation will be resumed. Primarily the ground on armature 2 and front contact of SG-1 relay 818 is extended over armature 8 and front contact of PN relay 843, the winding of PNC-1 relay 846 to battery. Previously a ground on armature 6 of SG-2 relay 802 had caused the operation of ADCK relay 817 so that now a circuit may be traced from ground on conductor 602, armature 1 and front contact of LTS relay 822, armature 2 and front contact of PNC-1 relay 846, front contact and armature 1 of ADCK relay 817 the winding of STC relay 805 to battery resulting in the operation of this start relay.

The STC relay 805 locks in a circuit from ground, front contact and armature 1 of ST relay 606, conductor 602, front contact and armature 4 of STC relay 805, front contact and armature 1 of ADCK relay 817 to the winding of the STC relay 805.

Upon the operation of STC relay 805 a circuit is closed from ground, armature 7 and front contact of relay 805, conductor 847, the chain circuit of the steering chain in Fig. 9, the normal contacts of armature 8 of the U relay 906, conductor 907, armature 2 and front contact of PN relay 843, conductor 848, winding of T relay 908 to battery. Relay 908 operates and establishes a condition whereby the interpolator tape will be stepped along until a PN code is encountered. A circuit is now established from ground, back contact and armature 4 of ADV relay 826, armature 4 and back contact of GD relay 824, armature 3 and back contact of GD-1 relay 825, armature 2 and front contact of LTS relay 822, winding of LTS-1 relay 823, whereby this relay 823 operates and locks through back contact and armature 4 of GD-1 relay 825 and through front contact and armature 2 of SG-2 relay 802 to ground. Through its auxiliary front contact, relay 823 extends ground over conductor 849, front contact and armature 11 of T relay 908, conductor 909, to the winding of ADV relay 826. This advance relay 826 operates and closes a circuit from ground, armature 3 and front contact of SG-2 relay 802, armature 1 and front contact of ADV relay 826, front contact and armature 1 of STC relay 805, winding of HSC relay 803 to battery as a result of which relay 803 operates and locks through its armature 2 independently of the ADV relay 826. Although the ADV relay 826 now opens the original ground circuit for the operation of LTS-1 relay 823 and its own winding the locking ground for the LTS-1 relay maintains the advance relay operated until the GD relays report the closure of the down check circuit in the five transmitter relays.

The operation of HSC relay 803 opens the holding circuit for the PPC relay 811 and this in turn opens the holding circuit for the PPH relay 807. When this relay releases, the LTS relay 822 releases but the LTS-1 relay 823 remains locked under control of the GD-1 relay 825. A circuit is now established from ground, armature 3 and front contact of SG-2 relay 802, armature 1 and front contact of HSC relay 803, conductor 831, winding of PPA relay 701, and this relay connects the five code relays 711 to 715 to the fingers of the transmitter, resting on a five hole code but none of these relays operate since the marking contacts are not grounded when the transmitter is at rest. Therefore as soon as the LTS relay is released the ground on conductor 602 is extended over armature 1 and back contact of LTS relay 822, conductor 845, the down check circuit of the transmitter relays 711 to 715, conductor 717 to the GD relay 824 which operates and in turn causes the operation of GD-1 relay 825. The operation of this latter relay opens the locking circuit of the LTS-1 relay 823 and therefore releases the ADV relay 826. When the advance relay is released a circuit is closed from ground, back contact and armature 3 of ADV relay 826, front contact and armature 2 of GD-1 relay 825, front contact and armature 3 of GD relay 824, conductor 832, armature 6 and front contact of PPA relay 701, auxiliary contact 705, conductor 706, armature 5 and back contact of PPH relay 807, armature 2 and back contact of TMC-1 relay 833, the winding of TMC relay 834 to battery. Relay 834 operates and extends the ground on armature 6 of PPA relay 701 over conductor 707, front contact and armature 2 of TMC relay 834 to the winding of TMC-1 relay 833 and in parallel therewith through the front contact and armature 1 of TMC relay 834, armature 1 and back contact of TMC-1 relay 833 (relay 833 will not operate until ground is removed from its armature 2), front contact and armature 3 of STC relay 805, conductor 814 to the winding of stop magnet 703. This magnet operates and the tape moves to another code. During its movement the auxiliary contacts 705 are opened whereupon ground is removed from the armature 2 of TMC-1 relay 833 so that this relay now operates in series with TMC relay 834 and both are held until the down check circuit is broken and relays GD and GD-1 release. The operation of TMC-1 relay opens the circuit of stop magnet 703 so that the tape is advanced but one code. During the cycle of operations of the transmitter, after the new code is brought into position the universal contact 708 is closed for a short interval before the cycle is completed and then opened at the completion thereof. During this interval the relays 711 to 715 are operated in code and locked over armature 2 and back contact of ADV relay 826 front contact and armature 1 of SG-2 relay to ground.

Thereafter, the step-by-step advance of the tape is caused by the repeated operation of the ADV relay 826. When the SG-2 relay 802 is operated the circuit is recycled to the extent that a new hunting operation is started in which the transmitter will move the tape continuously until a five hold code is found.

In the present instance the tape will move along one step at a time until the PN code is encountered. Any code other than the PN code will transmit a ground from the contacts of the transmitter relays 711 to 715 through one of armatures 1 to 6 of T relay 908 to conductor 910 to cause the operation of TAA relay 902 which releases the SG-2 relay 802 and results in another hunting operation of the tape transmitter. Let us assume that the interpolator tape such as that shown in Fig. 12 is resting on one of the five hole codes just before the 999 signal. Therefore the code now read will be for the digit 9 so that a circuit is completed through armature 2 of T relay 908 to operate the TAA relay 902. This causes the release of the SG-2 relay 802 which generally releases the relays of the interpolator control circuit and opens the holding circuit for the transmitter relays 711 to 715. Relay TAA therefore releases and again closes the circuit for the SG-2 relay 802 and the operations heretofore described are repeated, resulting in the movement of the interpolator tape over the remaining two digits of the 999 code, and the first PN code to the ER code. Thereafter the step-by-step movement of the tape will take place only this time the first code encountered will be the second PN code whereupon a circuit is established over armatures 7 and 8 of T relay 908 to operate the STP relay 911. This will extend the ground on conductor 848 to the winding of the next steering chain relay the U relay 906. During a short interval during which both the T relay 908 and the U relay 906 are operated, a circuit will be established from ground, front contact and armature 12 of T relay 908, front contact and armature 10 of U relay 906 to conductor 909 leading to the ADV relay 826. The advance relay operates and by opening the holding circuit for the transmitter relays 711 to 715 releases these relays to start the next step of the transmitter.

The next code shown in the tape of Fig. 12 is that for the digit 1 of the problem number 100. This is read through the contacts of the U relay 906 into the augend element 904 of the three digit adder to be registered in the U order thereof. As shown in detail in the said Andrews-Vibbard application the armature 6 of the U relay 906 is connected to a circuit which derives ground through armature 5 and back contact of the GD relay 824 over conductor 852 and the up check circuit of the U order of the augend element 904 which is here indicated by the dotted line connection near armature 6 of the U relay 906. Therefore when this digit 1 is successfully registered the circuit for the STP relay 911 will again be closed and the steering chain will be advanced so that the tens digit of the problem number may be read into the V order of the augend element 904. In this manner the three digits of the problem number are read into this element. In a manner fully explained in the said Andrews-Vibbard application the problem number which was read from the problem data tape into the T register 1104 is transferred to the addend element 903. Actually the digits read into the augend element 904 have been inverted so that the number 899 (the nines complement of 100) is registered there and now the summing operation may be performed to test the identity of the problem numbers read from the two tapes. Since we are not here concerned with the result of this test in the event that it is not perfect we will assume that it is perfect so that by energizing a carry one lead the sum produced will be

| Carry in |   |   | 1 |
|---|---|---|---|
| Addend | 1 | 0 | 0 |
| Augend | 8 | 9 | 9 |
| Sum | 1 | 0 | 0 | 0 |

The conductor 836 leading from the AADC relay 837 extends into a down check circuit controlled by the sum relays of the three digit adder here represented by the dotted line in the circuit of relay 837 so that if these sum relays are in proper released condition a ground on the armature and back contact of PN-2 relay 830 and armature 5 and front contact of STC relay 805 will be extended through armature 1 and front contact of PNC-1 relay 846 to cause the energization of the AADC relay 837. This relay operates, locks to the ground which caused its energization independent of the down check circuit of the sum relays and extends a ground over armature 3 and front contact of the PN-1 relay 846 to the carry one lead 851. This results in the operation of the sum relays to express the sum 000 and will here result in the closing of the circuit between the front contact of armature 3 of the PN relay 843 and the armature 6 thereof. As explained hereinbefore this will place a ground (in Fig. 10) on the front contact and armature 3 of the PN relay 1018 and thence over the armature 2 and front contact in series of each of relays 1001, 1002, 1003 and 1004, the back contact and armature of the ER relay 1010, armature 4 and back contact of the RC-1 relay 1013 to the recycle conductor 601 so that, the problem numbers having been successfully checked, the recycle relay 600 is operated and the master control circuit is recycled.

The summation of the problem numbers in the addend element 903 and the augend element 904 of the three digit adder which results in a sum either more or less than 1000 is an indication that the interpolator data tape must be moved either forwardly or backwardly. If the sum is greater than 1000 indicating that the number in the augend element 904 is less than the number in the addend element 903 and that the interpolator data tape must be moved in a forward direction to a higher problem number, circuits in sum element 905 will connect a ground to conductor 913 which will operate TAA relay 902. TAA relay 902 in operating will, as described hereinbefore, cause the release of SG-2 relay 802 which will release relays of the interpolator control circuit and open the holding circuit for the interpolator translator relays 711 to 715. Thereafter, TAA relay 902 releases and again closes the operating circuit for the SG-2 relay 802 and the operations hereinbefore described are repeated. These operations result in the forward movement of the interpolator tape to the next succeeding 5-hole ER code or data point symbol which precedes the first recorded time point block number of the problem just read. When the first 5-hole code is encountered the rapid movement of the tape is halted and the tape is advanced a step at a time in the manner hereinbefore described and each code is read as the tape is stepped. After the last 5-hole code of this data point symbol has been read, the tape is stepped to the next code (the first digit of a time block number) and a reading of the code will cause a ground to be applied to lead 910 which extends to the winding of TAA relay 902. The operation of TAA relay 902 will release SG-2 relay 802 which results in another hunting operation where the tape will be advanced rapidly to the next succeeding 5-hole code or data point symbol. These hunting operations are continued until a one-hole PN code which follows a series of 5-hole codes or data point symbols is read. This one-hole PN code is the problem number steering code which precedes the next higher valued problem number. Thereafter the step-by-step movement of the tape as described hereinbefore is resumed and the value of the new problem number is registered in the augend element 904 of the three digit adder. A new summation is made and the above process is repeated and continued until a sum of 1000 is obtained in sum element 905 indicating that the problem numbers in both the addend and augend elements of the three digit adder are the same.

In the event that the sum of the problem numbers in the addend element 903 and the augend element 904 of the three digit adder is less than 1000 indicating that the problem number in the augend element 904 is greater than the problem number in the added element 903 and that the interpolator data tape must be moved in a reverse direction to a lower problem number, circuits in sum element 904 will connect a ground to conductor 912 which will operate TAB relay 901. TAB relay 901 in operating completes a circuit for the operation of TARV relay 813 which may be traced from ground, armature 3 and front contact of TAB relay 901, through the winding of TARV relay 813 to battery. TARV relay 813 locks operated in a circuit through front contact and armature 3 of TARV relay 813, back contact and armature 3 of LTS relay 822, front contact and armature 3 of SG-1 relay 818 to ground. TARV relay 813 in operating applies ground through front contact and armature 4 of TARV relay 813 to conductor 841 which extends to reverse magnet 703 thus operating reverse magnet 703. TAB relay 901 in operating also completes a circuit for the operation of PNHB relay 926 which may be traced from ground, front contact and armature 1 of PN relay 843, back contact and armature 11 of U relay 906, front contact and armature 2 of TAB relay 901 through the winding of PNHB relay 926 to battery. PNHB relay 926 in operating transfers lead 910 from the winding of TAA relay 902 to the upper winding of TAB relay 901. PNHB relay 926 locks operated to its energizing circuit independently of the circuit through front contact and armature 2 of TAB relay 901 because it is necessary to keep PNHB relay 926 locked until the next PN code is reached. The next one-hole PN code will not appear until the beginning of the preceding problem number block is reached with many 5-hole codes intervening. TAB relay 901 in operating opens the operating circuit for SG-2 relay 802 which releases relays of the interpolator control circuit and opens the holding circuit for the translator relays 711 to 715. Thereafter TAB relay 901 releases and again closes the operating circuit for SG-2 relay 802 which reoperates. The reoperation of SG-2 relay 802 starts the automatic movement of the interpolator tape in the reverse direction.

When the interpolator tape moves back or in the reverse direction it must obviously bypass the first 5-hole ER code or data point symbol or symbols that it encounters in order to reach a problem number one less than the one from which it started. The manner in which this is accomplished will now be described. Upon the reoperation of SG-2 relay 802 a circuit is established from ground, armature 3 and front contact of SG-2 relay 802, armature 1 and back contact of HSC relay 803, conductor 804, the back contacts of each of armatures 1, 2, 3, 4 and 5 of PFA relay 701, any one or more of the transmitter fingers resting on its spacing contact, conductor 702, armature 2 and back contact of STC relay 805, armature 1 and back contact of PPD relay 806, armature 1 and back contact of PPH relay 807, through the winding of PPB relay 808 to battery. PPB relay 808 operates and closes an operating circuit for PPC relay 811 through both its armatures 1 and 2. The operating circuit for PPC relay 811 may be traced from ground, front contact and armature 3 of SG-2 relay 802, back contact and armature 2 of HSC relay 803, front contact and armature 1 and front contact and armature 2 of PPB relay 808 through the winding of PPC relay 811 to battery. PPC relay 811 in operating locks operated independently of PPB relay 808. The PPB relay 808 in operating also applies ground to the upper terminal of PPE relay 810 so that it cannot be operated when immediately thereafter the PPC relay 811 in operating applies ground to the lower terminal of PPE relay 810. It will be noted that hereinafter when the PPB relay 808 releases the PPC relay 811 will maintain the ground on the lower terminal of the PPE relay 810 while the PPB relay removes the ground from the upper terminal thereof so that PPE relay 810 will operate.

In response to the operation of PPC relay 811 a circuit is established from ground, armature 2 and front contact of PPC relay 811, armature 2 and back contact of PPH relay 807, back contact and armature 2 of PPF relay 812 through the winding of PPD relay 806 to battery. PPD relay 806 operates and locks to the ground from the fingers of the interpolator transmitter so that this relay will now be holding in a circuit which will only open when a 5-hole code is encountered so that none of the transmitter fingers will be resting on its spacing contact. The operation of PPD relay 806 releases PPB relay 808 whereupon PPE relay 810 operates. The operation of PPE relay 810 extends ground from front contact and armature of PPE relay 810, through armature 2 and front contact of TARV relay 813, through armature 2 and back contact of PPG relay 842 and thence through the winding of PPF relay 812 to battery. The establishment of this circuit grounds the upper terminal of PPG relay 842 and the operation of PPF relay 812 grounds the other terminal of PPG relay 842 so that PPG relay 842 is short-circuited and cannot be operated until the ground for the operation of PPF relay 812 is removed. The operation of PPF relay 812 opens the original operating circuit for PPD relay 806 and closes a circuit for energizing the interpolator transmitter tape stop magnet 703 extending from ground, armature 3 and front contact of PPF relay 812, armature 6 and back contact of PPH relay 807, armature 3 and back contact of STC relay 805, conductor 814 through the winding of stop magnet 703 to battery. Because tape stop magnet 703 and reverse magnet 716 are simultaneously operated, the interpolator data tape will be moved from code to code in the reverse direction in a manner similar to that described hereinbefore in connection with the master tape transmitter shown in Fig. 4. The release of PPD relay 806 when the first 5-hole ER code or data symbol is reached reoperates PPB relay 808 because the mechanical action of the interpolator transmitter in stepping to the 5-hole ER code causes the transmitter fingers to reengage the spacing contacts and therefore apply a ground to conductor 702. The reoperation of PPB relay 808 reestablishes the shunt on PPE relay 810. PPE relay 810, however, due to the short-circuit means of releases is slow and will not respond until the PPB relay 808 is held operated for a sufficient length of time. As the tape is moved back the second of the 5-hole ER code or double data symbols is reached and PPB relay 808 will release and allow the winding of PPE relay 810 to again become energized. Ordinarily only two data point symbols or 5-hole ER codes are encountered, but if the tape is perforated for an erasure (any number of 5-hole ER codes or data point symbols in sequence) the PPB relay 808 will operate and release until all of these erasures are bypassed. When the tape moves beyond these erasures the PPB relay 808 will remain operated long enough to release the PPE relay 810 which thereupon removes the original operating ground for the PPF relay 812 and allows PPG relay 842 to be operated in series with PPF relay 812. Upon the operation of PPG relay 842 a circuit is again established for the operating winding of PPD relay 806 through armature 1 and front contact of PPG relay 842, back contact and armature 2 of PPH relay 807, front contact and armature 2 of PPC relay 811 to ground. With PPD relay 806 operated, the PPB relay 808 is released and this in turn allows PPE relay 810 to reoperate. PPE relay 810 in reoperating closes the circuit for the operation of PPH relay 808 which may be traced from ground through front contact and armature of PPE relay 810, front contact and armature 2 of TARV relay 813, front contact and armature 2 of PPG relay 842 through the winding of PPH relay 807 to battery. PPH relay 807 operates and locks operated through front contact and armature 2 of PPH relay 807, front contact and armature 2 of PPC relay 811 to ground. PPH relay 807 in operating opens the original operating circuit for stop magnet 703. However, stop magnet 703 is held operated through front contact and armature 2 of PPD relay 806, front contact and armature 3 of PPF relay 812 to ground. The interpolator data tape is moved rapidly in the reverse direction until the next 5-hole ER code or data point symbol is reached. The next 5-hole code or data point symbol which will be encountered will be the data point symbol which precedes the last recorded time block number in the next lower numbered problem. When this data point symbol is reached all five transmitter fingers will be simultaneously lifted off of their spacing contacts and thence PPD relay 806 will release. The movement of armature 2 of PPD relay 806 opens the circuit for stop magnet 703 and transfers the ground thereon through the front contact and armature 4 of PPH relay 807 through the winding of LTS relay 822 to battery thus operating this relay. LTS relay 822 in operating opens the locking circuit for TARV relay 813 which releases and in turn releases reverse magnet 716. Thereafter the step-by-step movement of the tape in a forward direction as described hereinbefore is resumed and the code which follows the data point symbol will be read. Because this data point symbol is not a 5-hole code which precedes a problem number but is one which precedes a time block number, the code which will be read will be the first digit of a time block number. In response to a reading of this code a ground will be applied to lead 910 which now extends through front contact and armature 2 of PNHB relay 926 through the winding of TAB relay 901. The operation of TAB relay 901 will release SG-2 relay 802 and another hunting operation in the reverse direction will be initiated. These hunting movements in the reverse direction will be continued until a one-hole PN code which follows a series of 5-hole codes or data point symbols is read. The reading of this PN code will cause the operation of STP relay 911 as hereinbefore described and the value of the new problem number which follows is registered in the augend element 904 of the three digit adder. A new summation is made and the above-described processes repeated and continued until a sum of 1000 is obtained in sum element 905 indicating that the problem numbers in both the addend and augend elements of the three digit adder are the same.

Now when the above-described operation has been accomplished and the problem numbers in the interpolator and problem data tapes have been successfully checked, the recycle relay 600 in the master control circuit will be operated and the master control circuit will be recycled as described hereinbefore. The recycle of the master control circuit will cause the problem data tape to be stepped to the next code position in the manner described hereinbefore and the next code it will read will be a one hole code shown in Fig. 12 as ID (also known for other purposes as NC) which will result in the operation of the NC relay 1014. At the stage reached, the master control circuit has been recycled and the problem data circuit has started to read off the tape the various items of identification data. The NC-2 relay 1106 will be operated so that this data may be read directly from the problem data tape into the printer control circuit 630 and be printed. The ID code in the problem data tape will, as just mentioned bring up the NC relay 1014. When this code is also transmitted to the printer it will cause a carriage return and line feed operation thereat and since the operation of these circuits is very rapid there are generally at least two of the ID codes punched in the tape to insure that the printer will have completely carried out the carriage return and line feed operations before the first of the identification data is transmitted thereto. As described in detail in the said Andrews-Vibbard application, the identification data following the 3ID codes in the problem data tape is transmitted to the printer control 630 and this data is then printed. The problem data tape will be moved forward a step at a time under control of the printer control 630 and will come to rest on a 5-hole ER code following the identification data. The occurrence of the 5-hole ER code on the tape will cause ER relay 1010 and ER-1 relay 1012 to operate in the manner described hereinbefore which in turn will release NC relay 1014, NC-1 relay 1127 and NC-2 relay 1106. The circuit then rests in this position until the master control circuit signals it to advance as described below.

As described hereinbefore, the master control circuit recycles in response to the operation of RC relay 600 after the synchronization of the interpolator data tape and problem data tape has been completed. The master control tape is returned to its starting point and from there it steps forward in the manner hereinbefore described to the point at which master code 05 is recorded. Master code 05 in the master tape will cause a ground to be applied to the PD–TQZ lead 520. This ground may be traced into the problem data control circuit through back contact and armature 5 of RC-1 relay 1013, front contact and armature 4 of ER-1 relay 1012, through the winding of T relay 1100 to battery. In the manner hereinbefore described, the problem data tape will be moved in a forward direction one step at a time and the time block number 185 will be recorded in the U, V and W orders of T register 1104. Upon the completion of the registration of the digit 5 in the W order of T register 1104, the up-check circuit of T register 1104 will apply ground to conductor 1118 which will cause the operation of advance relay 1017 in the manner hereinbefore described and the problem data tape will be advanced to the next code position which is the Z or recycle code. It will be observed that the elevation and range data for time block 185 is missing from the problem data tape and therefore the Z recycle code is used in the problem data tape at this point to cause a complete recycle of the master control circuit which in turn causes the problem data tape to move in a step-by-step fashion to the next 5-hole ER code whereupon ground is again applied to the PD–TQZ lead 520. After the recycle of the master control circuit, the problem data tape is stepped in the manner described hereinbefore to time block 186 and the digits 1, 8 and 6 are then recorded in the U, V and W orders of T register 1104 in the manner hereinbefore described. When the digit 6 is registered in the W order of T register 1104, the up-check circuit of the T register will again apply ground to conductor 1118 which is extended through front contact and armature 6 of T relay 1100, conductor 1119 through the winding of ADV relay 1017 to battery. As described hereinbefore ADV relay 1017 in operating causes the problem data tape to advance to the next code position which is the one-hole steering code for the Q register. The operation of ADV relay 1017 closes a circuit from ground on PD–TQZ lead 520, through back contact and armature 5 of RC-1 relay 1013, front contact and armature 4 of T relay 1100, conductor 1128, front contact and armature 1 of ADV relay 1017, step conductor 623 to step relay 420 in the master control circuit. The ground applied to step conductor 623 operates step relay 420 which advances the master control tape one step in the forward direction as described hereinbefore. The advance of the master control tape to the next code position will remove ground from PD–TQZ lead 520 which will permit T relay 1100 to release.

The problem data control circuit proceeds independently of the master control circuit to set the five digits representing the quadrant elevation in the V, W, X, Y and Z orders of Q register 1109. With the problem data tape resting at the code position for the steering code of the Q register (one-hole EL code shown in Fig. 12) relay 1001 will be operated in response to the reading of this code. The operation of relay 1001 will complete a circuit for the operation of Q relay 1125 which may be traced from ground, back contact and armature 3 of GD relay 1006, back contact and armature 3 of GD-1 relay 1008, back contact and armature 2 of M relay 1009, front contact and armature 2 of A relay 1001 through the winding of Q relay 1125 to battery. The operation of Q relay 1125 will close a circuit from ground, back contact and armature 4 of ADV relay 1017, conductor 1121, front contact and armature 3 of Q relay 1125, conductor 1128 to Q register 1109. The ground thus applied on conductor 1128 operates the cut-in relays of Q register 1109 and prepares the Q register for receiving and registering the 5 digits of the quadrant elevation data. When the circuits of the Q register are in condition and ready to accept a new registration, a ground will be applied to lead 1129 which is extended through front contact and armature 1 of Q relay 1125 to start lead 1105. The ground on start lead 1105 will be extended through normal contacts of armature 3 of Z relay 1130 through the Y and X relays of the steering circuit not shown in Fig. 11, through normal contacts of armature 3 of W relay 1115, through normal contacts of armature 3 of V relay 1102, through back contact and armature 2 of T relay 1100, through the winding of V relay 1102 to battery. This starts the operation of the steering relays of Fig. 11 as hereinbefore described, and the circuit then proceeds to set up the data from the next 5 codes in the V, W, X, Y and Z orders of the Q register in the manner previously described for the T register 1104, except that the V relay 1102 was the first relay in the steering chain which operated instead of the U relay 1103 as hereinbefore described. Because X0 relay 1101 will not be operated, the steering chain must operate through the X, Y and Z relays to complete the registration in the X, Y and Z orders of Q register 1109 before the up-check circuit in the Q register is completed. When the last digit of the quadrant elevation information is recorded in the Z order of the Q register 1109, the up-check circuit of the Q register operates and connects the ground to conductor 1131 which is extended through back contact and armature 6 of T relay 1100, front contact and armature 2 of Q relay 1125, conductor 1119 through the winding of ADV relay 1017 to battery. ADV relay 1017 in operating causes the problem data tape to step to the next code position which is the steering code for the Z register (one-hole RA code shown in Fig. 12).

The problem data control circuit of Fig. 10 and the steering chain circuit of Fig. 11 then proceed to set up the five digits of the range information in the V, W, X, Y and Z orders of Z register 1124. The procedure is identical to that for the Q register except that the FZ relay 1126 is operated instead of the Q relay 1125. Upon completion of the registering of the five digits of the range information in the orders of the Z register, the Z register up-check circuit will close and connect a ground to conductor 1133 which extends through back contact and armature 6 of T relay 1100, back contact and armature 2 of Q relay 1125, front contact and armature 2 of FZ relay 1126, conductor 1119 through the winding of ADV relay 1017 to battery. ADV relay 1017 in operating steps the problem data tape to the next code position where the tape stops awaiting a further order from the master control circuit. This code is a 5-hole ER code, the first code of the data point symbol for time block 187 as shown in Fig. 12. The problem data tape will remain at this code until signaled by the master control circuit to proceed to the next time block and set up the data for the next calculating operation. The problem data tape may be advanced to time block 187 by the master control circuit under several conditions. It may be advanced when the master control circuit is signaled that a complete cycle of operation has been completed and that new data is required so as to initiate a new cycle of operation. It may also be advanced when the master control circuit is recycled in response to a recycle signal from the interpolator data transmitter indicating that required data for the particular time block under calculation is not recorded in the interpolator data tape and that the operation being made should be abandoned and a new cycle of operation started utilizing data from the next highest time block number.

The manner in which the calculator is controlled in its pattern of operation by the master control circuit will now be described in a general way with reference to Fig. 13. Fig. 13 shows certain elements of the calculator in block form and the leads which connect these elements to the master data circuit, the problem data control circuit, the interpolator data control circuit and the various registers. The detailed circuits of the various elements of the calculator within each of the blocks shown in Fig. 13 are disclosed in the said Andrews-Vibbard application. The description which follows, although of a general nature, will be sufficient to disclose the manner in which the master control circuit exercises control over the calculator. A more detailed description is contained in the said Andrews-Vibbard application. After the time block number, quadrant elevation information and range information recorded in the problem data tape have been registered in the T, Q and Z registers as described above, the master control tape will be moved a step at a time as described in the said Andrews-Vibbard application and will come to rest on master code 84 (operation number 7 in the typical problem described in the said Andrews-Vibbard application). Master code 84 is a code for setting the multiplying steering circuit 1304 in the manner required for carrying out a desired multiplying operation. The operation of the translator relays 501 to 505 and 511 to 515 of the master control circuit in response to a reading of master code 84 will cause the operation of master code relays such as 506, 507 and 508 which in turn will apply grounds to three leads in cable 524. These three leads are the SS, ES and POS leads. Ground on the SS lead of cable 524 operates the multiplying steering circuit 1304 which in turn operates switching relays 1307 over cable 1312 to cause the result of the multiplying operation to be registered in C register 1308. The ground on the ES lead of cable 524 causes the operation of the multiplying steering circuit 1304 to end the process of multiplying after the first operation in which the product of a multiplicand and a one digit multiplier is registered on the C register 1308. Ground on the POS lead of cable 524 operates the multiplying steering circuit 1304 in such a way as to indicate that the multiplier to be used is a positive number. When the multiplying steering circuit 1304 has operated in response to the grounds applied to the SS, ES and POS leads of cable 524, an up-check circuit is closed and ground is applied to conductor 623 which operates STP relay 420 and causes the master control tape to be stepped to the next master code. The next master code, as observed in the typical problem in the said Andrews-Vibbard application, is master code 51. Master code 51 is a code which asks the calculator to perform a multiplying operation in which the multiplicand will be obtained from the V, W, X, Y and Z orders of the Q register and will be multiplied by a fixed digit multiplier (in this case the digit 5) which the calculator itself must furnish. This code also requests that the derived product be registered in the C register 1308. When the translator relays 501 to 505 and 511 to 515 of the master control circuit are operated in response to a reading of a master code 51, master code relays such as 506, 507 and 508 will be operated in such a way as to place grounds on three leads of cable 523. Two of these leads, lead QMV and lead 5R extend to the calculator function control cut-in relays 1303 and the third lead, lead CRC, extends to the C register 1308. Ground on the QMV lead of cable 524 operates the function control cut-in relays 1303 which in turn cause a ground to be supplied to lead 1310 which extends to the Q register 1109. This causes the Q register 1109 to be connected to the M multiple 1135 which in turn causes multiplying relays 1301 of the calculator to be operated in accordance with the setting of the V, W, X, Y and Z orders of the Q register. The ground on lead 5R of cable 524 causes the operation of the function control cut-in relays 1303 which in turn extend grounds over R multiple 914 to operate a fixed digit multiplier relay in multiplier relays 1302 to establish as a multiplier, the digit 5. Ground on CRC lead of cable 524 which extends to C register 1308, releases the C register 1308 so as to wipe out any previous registration contained therein and prepares the C register 1308 for receiving the product of the multiplication to be performed by the calculator. As described in detail in the said Andrews-Vibbard application, when the multiplying relays 1301 have been operated via the M multiple 1135 from Q register 1109 in accordance with the values registered therein and when the multiplier relays 1302 have been operated in accordance with a fixed digit multiplier, the product of the multiplicand and the multiplier is registered in the A register 1305 and B register

1306. When the registration in the A and B registers is completed, the quantities in the two registers are summed and registered in the C register 1308. When the registration in C register 1308 is completed, an up-check circuit therein is closed and the ground will be applied to conductor 1311 which is extended through the multiplying steering circuit 1304 to step conductor 623 which operates step relay 420 and steps the master tape to the next master code. It will, therefore, be observed that the orders in the master control tape control the pattern of operation of the calculator to perform a desired mathematical operation. To perform a given problem in multiplication the master control tape contains an order for setting the multiplying steering circuit 1304 in the desired manner. This code is read from the tape and by means of the translator relays in the master control circuit a particular master code relay is operated and grounds are extended over three leads to the multiplying steering circuit to operate it in the desired manner. After the multiplying steering circuit has been properly set in accordance with the steering circuit code recorded in the master control tape, the master control circuit is caused to step master control tape to the next code which causes the multiplicand of the multiplying problem to be furnished to the calculator from any register such as Q register 1109 for operating the multiplying relays 1301. This master code in the master control tape also causes the multiplier of the multiplying problem to be furnished by the calculator over the R multiple for operating the multiplier relays 1302. With the multiplicand in the multiplying relays 1301 and the multiplier in the multiplier relays 1302, the calculator then proceeds to perform the problem in multiplication as described in the said Andrews-Vibbard application. When the problem is completed and the product registered in C register 1308, the master control circuit is signaled that the problem is finished, and it causes the master control tape to step to the next master code.

As described in detail in the said Andrews-Vibbard application with reference to the typical problem for calculating director errors disclosed therein, the cycle of operation of the master control tape is moved forward step by step and the time of flight is calculated. After the time of flight is calculated by the calculator, the master control tape contains orders for calculating the firing time. The value of the calculated firing time is then recorded in the T register 1104. The master control tape then contains master code 01 (operation No. 36 of the typical problem in the said Andrews-Vibbard application) which causes the interpolator control circuit to function and start the hunting of the interpolator transmitter to find a time block recorded in the interpolator tape which is one less than the calculated firing time recorded in T register 104. During the time the interpolator transmitter is moving the interpolator tape to the T–1 time block, the master control circuit causes the calculator to calculate the various interpolator coefficients required for the calculation of the director errors. These interpolator coefficients are calculated and transferred to the F registers. For example, operation No. 58 in the typical problem in the said Andrews-Vibbard application causes one of the coefficients to be stored in the F1 register 1136. After the interpolator data tape has been moved to the time block which is one less than the calculated firing time registered in T register 1104, the movement of the interpolator tape will be halted on the third or last digit of the time block number. The manner in which the interpolator data tape is moved to the time block for T–1 is described in detail in the said Andrews-Vibbard application. The interpolator control circuit, in this operation, functions in a manner similar to that described hereinbefore when the interpolator tape and the problem tape were synchronized on a problem number. The interpolator tape is stepped to a time block number and the values in the U, V and W orders of the T register 1104 and those read from the interpolator tape are summed in the three digit adder. In this case, however, the carry in 0 lead is grounded so that a check is obtained (a sum of 1000) only when the interpolator transmitter has read a time block number which is one less than that recorded in the U, V and W orders of T register 1104. In other words, the interpolator data tape is moved either forward or backward until a data point check is attained at which time further progress of the circuit is blocked until an additional order is received from the master control circuit.

The manner in which the calculator controls the movement of the interpolator data tape will now be described in a general way. A detailed description of this operation is contained in the said Andrews-Vibbard application. With the interpolator data tape resting at the last digit of the time block number T–1 as described above, it may be desired to perform a calculation in which a value which is registered in the F1 register 1136 is utilized as a multiplicand and in which data recorded in the interpolator data tape is used as a multiplier. Such a problem is illustrated by operations No. 125 and No. 126 in the typical problem described in the said Andrews-Vibbard application. As described hereinbefore and in the said Andrews-Vibbard application, when the interpolator control circuit has caused the advance of the interpolator tape to the point where the last digit of a time block number is resting at the reading position of the interpolator transmitter and where the circuit is awaiting further orders from the master control circuit, the following relays of the interpolator control circuit are operated: SG–1 relay 818 is locked operated in a circuit from ground, front contact and armature 2 of ST–4 relay 603, conductor 611, front contact and armature 1 of SG–1 relay 818 through the winding of SG–1 relay 818 to battery. SG–2 relay 802 is held operated in a path which may be traced from ground, armature 1 and front contact of ST–4 relay 603, conductor 610, armature 1 and back contact of OHC relay 900, armature 1 and back contact of TAB relay 901, armature 1 and back contact of TAA relay 902, armature 4 and front contact of SG–2 relay 802 through the winding of SG–2 relay 802 to battery. ADCK relay 817 is held operated in a circuit which may be traced from ground, front contact and armature 6 of SG–2 relay 802, armature 2 and front contact of ADCK relay 817 through the winding of ADCK relay 817 to battery. STC relay 805 is held operated in a circuit which may be traced from ground, armature 1 and front contact of ST relay 605, conductor 602 armature 4 and front contact of STC relay 805, armature 1 and front contact of ADCK relay 817 through the winding of STC relay 805 to battery. HSC relay 803 is held operated in a circuit which may be traced from ground, armature 3 and front contact of SG-2 relay 802, armature 2 and front contact of HSC relay 803, armature 1 and front contact of STC relay 805, through the winding of HSC relay 803 to battery. PPA relay 701 is held operated in a circuit which may be traced from ground, armature 3 and front contact of SG-2 relay 802, armature 1 and front contact of HSC relay 803, conductor 831, through the winding of PPA relay 701 to battery. MCT relay 801 is held operated over a circuit which may be traced from ground, armature 2 and front contact of SG-1 relay 818, back contact and armature of TCO relay 819, front contact and armature 1 of MCT relay 801 through the winding of MCT relay 801 to battery. TCOA relay 820 is held operated in a circuit which may be traced from ground, armature 2 and front contact of SG-1 relay 818, back contact and armature of TCO relay 819, front contact and armature 1 of MCT relay 801, through the winding of TCOA relay 820 to battery. The operated ones of translator relays 711 through 715 in the interpolator translator which operated in response to the reading of the third digit of the time block T-1 are held operated in a circuit which may be traced from ground, armature 1 and front contact of SG-2 relay 802, armature 2 and back contact of ADV relay 826, through a front contact and armature of the operated ones of relays 711 through 715 to battery through the windings of these relays. W relay 916 in the interpolator control steering circuit is held operated over a circuit which may be traced from ground, front contact and armature 7 of STC relay 805, conductor 847, normal contacts of armature 10 of Y relay 918, normal contacts of armature 9 of X relay 917 through front contact and armature 7 of W relay 916 through the winding of W relay 916 to battery.

When it is desired to perform a multiplying operation such as that described above, the multiplying steering circuit 1304 must be properly set. Therefore, master code 57 (as shown in operation No. 125 in the typical problem in the Andrews-Vibbard application) is perforated in the master control tape. The operation of the tens and units relays of the master control translator shown in Fig. 5 in response to a reading of this code will cause the operation of a master code relay which in turn will cause grounds to be applied to three conductors in cable 525 which extends to the multiplying steering circuit 1304. Ground on the S-2 lead of cable 525 sets the multiplying steering circuit to shift the product of the multiplication two places to the right. Ground on the E-5 lead of cable 525 causes the multiplying steering circuit 1304 to end the multiplication at the proper time. Ground on the POS lead of cable 525 sets the multiplying steering circuit 1304 for a multiplier which is positive. The operation of the multiplying steering circuit 1304 in response to these operations will cause switching relays 1307 to operate over cable 1312 so that the product of the multiplication may be stored in the proper register (either the C register 1308 or D register 1309). When the multiplying steering circuit 1304 has properly responded to the grounds of leads S-2, E-5 and POS of cable 525, an up-check circuit will be closed which will apply ground to step conductor 623 which extends to the winding of STP relay 420. The operation of STP relay 420 will cause the master control tape to advance to the next code. The next code, as shown in operation No. 126 in the typical problem in the said Andrews-Vibbard application, is code 82. The operation of a master code relay of Fig. 5 by the tens and units relays of the master control translator in response to a reading of code 82 will apply grounds to three conductors in cable 526 which extends to the function control cut-in relays 1303. Ground on the F1MV lead of cable 526 is a signal for the function control relays 1303 to associate the F1 register 1136 with the M multiple 1135 so that the digital values registered in F1 register 1136 may be extended over M multiple 1135 to operate multiplying relays 1301. As described hereinbefore, the function control relays 1303 perform this operation by extending a ground over conductor 1310 to F1 register 1136. In this manner, the value registered in F1 register 1136 will be utilized as the multiplicand of the multiplying problem which is to be performed. The grounds supplied over code leads T-1 and RA of cable 526 are signals to the function control cut-in relays 1303 that the multiplying problem to be performed is one in which the five digits of the range data recorded in the interpolator data tape for time block T-1 will be utilized as multiplier digits. The grounds on leads T-1 and RA of cable 526 will operate the function control cut-in relays 1303 which in turn will enable the interpolator data control circuit to transmit into the R multiple 914 the values of the range information recorded in the interpolator data tape in time block T-1. For example, assume that the calculated firing time recorded in T register 1104 is 187.452. Therefore, in response to the signal from the master control circuit, the interpolator data tape has been moved to time block 186 and the code for the digit 6 is now resting under the reading position of the interpolator data transmitter. It will be noted from the tape shown in Fig. 12 that the data perforated in the tape following time block 186 is the data for the quadrant elevation. However, in the assumed problem, it is desired to utilize the range data which is perforated in the tape following the quadrant elevation data. The manner in which the calculator causes the interpolator control circuit to step the tape past the quadrant elevation information to the range data and the manner in which this range data is transmitted over the R multiple 914 to set the multiplier relays 1302 will now be described.

The ground applied to code lead T-1 of cable 526 will cause the function control cut-in relays 1303 to operate and in turn extend a ground over the T-1 lead 1313 which extends through the winding of TCO relay 819 through the lower winding of TCOA relay 820 to battery. TCO relay 819 operates in series with the TCOA relay 820 which had been previously locked operated through its upper winding and TCOA relay 820 is held operated. The ground applied to code lead RA of cable 526 will cause the function control cut-in relays 1303 to operate and extend a ground over the RA lead of cable 1314 through the winding of RA relay 920 to battery thereby operating RA relay 920. The operation of RA relay 920 closes a circuit for the operation of step relay 911 which may be traced from ground, front contact and armature 5 of SG-1 relay 818, back contact and armature 5 of GD relay 824, conductor 852, front contact and armature 2 of RA relay 920, through the winding of STP relay 911 to battery. STP relay 911 in operating completes a circuit for the operation of X relay 917 which may be traced from ground, front contact and armature 7 of STC relay 805, conductor 847, normal contacts of armature 10 of Y relay 918, normal contacts of armature 9 of X relay 917, front contact and armature 6 of W relay 916, back contact and armature 6 of V relay 915, back contact and armature 7 of U relay 906, back contact and armture 9 of T relay 908, front contact and armature of STP relay 911, back contact and armature 10 of T relay 908, back contact and armature 9 of U relay 906, back contact and armature 8 of V relay 915, front contact and armature 8 of W relay 916 through the winding of X relay 917 to battery. X relay 917 operates and locks operated in a circuit which may be traced from battery through the winding of X relay 917, front contact and armature 9 of X relay 917, normal contacts of armature 10 of Y relay 918 to ground on conductor 847. After X relay 917 operates, W relay 916 is held operated over a circuit which may be traced from battery through the winding of W relay 916, armature 7 and front contact of W relay 916, armature 6 and front contact of W relay 916, back contact and armature 6 of V relay 915, back contact and armature 7 of U relay 906, back contact and armature 9 of T relay 908, front contact and armature of STP relay 911, back contact and armature 10 of T relay 908, back contact and armature 9 of U relay 906, back contact and armature 8 of V relay 915, front contact and armature 8 of W relay 916, front contact and armature 9 of X relay 917, normal contacts of armature 10 of Y relay 918 to the ground on conductor 847. The operation of X relay 917 completes a circuit for the operation of ADV relay 826 which may be traced from ground, front contact and armature 10 of W relay 916, front contact and armature 11 of X relay 917, conductor 909, through the winding of ADV relay 826 to battery. When ADV relay 826 operates it opens its locking circuit for the operated ones of the translator relays 711 through 715 which release. When all of the translator relays 711 through 715 are released, the down-check circuit is closed for the operation of GD relay 824. The circuit for the operation of GD relay 824 may be traced from ground, front contact and armature 1 of ST relay 609, conductor 602, back contact and armature 1 of LTS relay 822, conductor 845, through the down-check circuit completed by the release of relays 711 through 715, conductor 717 through the winding of GD relay 824. GD relay 824 in operating operates GD-1 relay 825 over an obvious circuit. When GD relay 824 operates, it opens the operating circuit for STP relay 911 which releases. The release of STP relay 911 releases W relay 916. When W relay 916 releases, it opens the operating circuit for ADV relay 826 which releases. When ADV relay 826 releases, it completes a circuit for the operation of TMC relay 834 which may be traced from ground, armature 3 and back contact of ADV relay 826, armature 2 and front contact of GD-1 relay 825, armature 3 and front contact of GD relay 824, conductor 832, front contact and armature 6 of PPA relay 701, auxiliary contacts 705, conductor 706, back contact and armature 5 of PPH relay 807, back contact and armature 2 of TMC-1 relay 833 through the winding of TMC relay 834 to battery. TMC relay 834 operates and extends ground on armature 6 of PPA relay 701, over conductor 707, front contact and armature 2 of TMC relay 834, to the winding of TMC-1 relay 833 and in parallel therewith, through the front contact and armature 1 of TMC relay 834, armature 1 and back contact of TMC-1 relay 833 (TMC-1 relay 833 will not operate until ground is removed from its armature 2), front contact and armature 3 of STC relay 805, conductor 814, through the winding of stop magnet 703 to battery. Stop magnet 703 operates and moves the tape to the next code. As hereinbefore assumed, the interpolator data tape was resting in the interpolator data transmitter at the position of the third digit (the digit 6) of time block 186. Therefore, the tape will be advanced to the position of the one-hole EL code. During the movement of the tape, auxiliary contacts 705 are opened whereupon the ground is removed from armature 2 of TMC-1 relay 833 so that this relay now operates in series with TMC relay 834 and both are held until the down-check circuit is broken and GD relay 824 and GD-1 relay 825 release. The operation of TMC-1 relay 833 opens the circuit of stop magnet 703 so that the interpolator data tape is advanced but one code. During this cycle of operations of the interpolator transmitter, after the new code (one-hole EL code) is brought into position, universal contact 708 is closed for a short interval before the cycle is completed and then opened at the completion thereof. During this interval, translator relay 711 will operate in response to the reading of the one-hole EL code. A relay 711 will lock operated over armature 2 and back contact of ADV relay 826, armature 1 and front contact of SG-2 relay 802 to ground. When A relay 711 operates, the down-check circuit is broken and GD relay 824 and GD-1 relay 825 release. When GD relay 824 and GD-1 relay 825 release, TMC relay 834 and TMC-1 relay 83 release. With X relay 917 operated, a circuit is now closed for the operation of LTS-1 relay 823 which may be traced from the ground applied to the EL lead of cable 718 by A relay 711 of the interpolator translator through armature 3 and front contact of X relay 917, back contact and armature 1 of EL relay 919, conductor 922, through the winding of LTS-1 relay 823 to battery. The EL code which was read from the interpolator translator tape is a synchronizing code for the quadrant elevation information which is perforated in the interpolator tape immediately following this code. However, under the assumed condition, the range information in the interpolator tape is desired. Therefore, the interpolator tape must be stepped past the one-hole EL code and past the five codes in the interpolator tape which represent the quadrant elevation information, to the position of the one-hole RA code.

When LTS-1 relay 823 operates it locks operated in a circuit which may be traced from ground, front contact and armature 2 of SG-2 relay 802, back contact and armature 4 of GD-1 relay 825, through front contact and armature of LTS-1 relay 823, through the winding of LTS-1 relay to battery. LTS-1 relay 823 in operating also completes a circuit for the operation of ADV relay 826 which may be traced from the locking ground on the armature of LTS-1 relay 823, through the auxiliary front contact of LTS-1 relay 823, conductor 849, front contact and armature 13 of X relay 917, conductor 909, through the winding of ADV relay 826 to battery. ADV relay 826 in operating, releases A relay 711 of the interpolator translator. With A relay 711 released, it recloses the down-check circuit and GD relay 824 operates and in turn operates GD-1 relay 825. When GD-1 relay 825 operates, LTS-1 relay 823 is released which in turn releases ADV relay 826. With the release of ADV relay 826 and the operation of GD relay 824 and GD-1 relay 825, the circuit is again closed for the operation of TMC relay 834. TMC relay 834 operates as described hereinbefore and closes a circuit for the operation of stop magnet 703. Stop magnet 703 operates and the interpolator tape is moved to the next code. During its movement auxiliary contacts 705 are opened and ground is removed from armature 2 of TMC-1 relay 833 so that this relay now operates in series with TMC relay 834 and both are held until the down-check circuit is broken and GD relay 824 and GD-1 relay 825 release. The operation of TMC-1 relay 833 opens the circuit of the stop magnet 703 so that the tape is advanced but one code. During the cycle of operations of the transmitter and after the new code (which is the code for the first digit of the quadrant elevation information) is brought into position, universal contact 708 is closed for a short interval and translator relays 711 through 715 are operated in code and locked over armature 2 and back contact of ADV relay 826, front contact and armature 1 of SG-2 relay 802 to ground.

The operation of translator relays 711 through 715 in response to the reading of the first digit of the quadrant elevation information will cause a ground to be applied to the 00 or 5 leads of cable 718 which are extended through front contacts and armatures 1 and 2 of X relay 917, to BP lead. This BP lead is extended by a conductor 922, through the winding of LTS-1 relay 823, thus operating LTS-1 relay 823. The LTS-1 relay 823 in operating again operates the ADV relay 826 and the cycle hereinbefore described is repeated and the interpolator tape is stepped to the next code. The stepping movement of the interpolator tape is continued until the one-hole RA code is read and translated by the translator relays 711 through 715.

The translation of the one-hole RA code (which is the synchronizing code for the range information) will cause a ground to be applied to the RA lead of cable 718 which is in turn extended through armature 4 and front contact of X relay 917 through armature 1 and front contact of RA relay 920 (RA relay 920 being operated as described above in response to the RA code from the master control circuit), through the winding of ERAC relay 923 to battery, thus operating ERAC relay 923. ERAC relay 923 locks operated over a circuit which may be traced from ground, armature 5 and front contact of SG-1 relay 818, back contact and armature 1 of GD-1 relay 824, through front contact and armature of ERAC relay 923 through the winding of ERAC relay 923 to battery. ERAC relay 923 in operating extends the ground on its armature through its auxiliary front contact, front contact and armature 7 of X relay 917, through the winding of STP relay 911. STP relay 911 operates and completes a circuit for the operation of Y relay 918 which may be traced from ground, armature 7 and front contact of STC relay 805, conductor 847, normal contacts of armature 10 of Y relay 918, front contact and armature 8 of X relay 917, back contact and armature 6 of W relay 916, back contact and armature 6 of V relay 915, back contact and armature 7 of U relay 906, back contact and armature 9 of T relay 908, front contact and armature of STP relay 911, back contact and armature 10 of T relay 908, back contact and armature 9 of U relay 906, back contact and armature 8 of V relay 915, back contact and armature 8 of W relay 916, front contact and armature 10 of X relay 917 through the winding of Y relay 918 to battery. Y relay 918 locks operated in a circuit which may be traced from battery through the winding of Y relay 918, front contact and armature 10 of Y relay 918, to ground on conductor 847. X relay 917 remains operated over a path which may be traced from ground on conductor 847 through front contact and armature 10 of Y relay 918, front contact and armature 10 of X relay 917, back contact and armature 8 of W relay 916, back contact and armature 8 of V relay 915, back contact and armature 9 of U relay 906, back contact and armature 10 of T relay 908, front contact and armature of STP relay 911, back contact and armature 9 of T relay 908, back contact and armature 7 of U relay 906, back contact and armature 6 of V relay 915, back contact and armature 6 of W relay 916, front contact and armature 8 of X relay 917, front contact and armature 9 of X relay 917, to battery through the winding of X relay 917. When Y relay 918 operates it completes a circuit for the operation of ADV relay 826 which may be traced from ground, front contact and armature 12 of X relay 917, front contact and armature 11 of Y relay 918, conductor 909, through the winding of ADV relay 826. ADV relay 826 in operating, releases the translator relay 715 which operated in response to the reading of the one-hole RA code. The release of E relay 715 recloses the down-check circuit and GD relay 824 operates and in turn operates GD-1 relay 825. When GD relay 824 and GD-1 relay 825 operate, TMC relay 834 and TMC-1 relay 833 are released. The operation of GD relay 825 also releases ERAC relay 923 which in turn releases STP relay 911. When STP relay 911 releases it opens a holding circuit for X relay 917 which releases. When X relay 917 releases it opens a circuit for ADV relay 826 which releases. With ADV relay 826 released and GD relay 824 and GD-1 relay 825 operated, the circuit for the operation of TMC relay 834 is again completed. TMC relay 834 will operate as described hereinbefore and complete the circuit for the operation of stop magnet 703. Stop magnet 703 operates and the interpolator data tape is moved to the next code position which is the position of the first digit of the range information. During its movement, auxiliary contacts 705 are opened whereupon TMC-1 relay 833 operates as described hereinbefore and opens the circuit for stop magnet 703 so that the interpolator tape is advanced but one code position. During the cycle of operations of the interpolator transmitter, after the new code is brought into position, the universal contact 708 is closed for a short interval. During this interval, translator relays 711 through 715 are operated in code and locked over armature 2 and back contact of ADV relay 826, front contact and armature 1 of SG-2 relay 802 to ground. The operation of translator relays 711 through 715 in response to the reading of the first digit of the range of information will open the down-check circuit and release GD relay 824 which in turn releases GD-1 relay 825. The release of GD relay 824 and GD-1 relay 825 releases TMC relay 834 and TMC-1 relay 833 as described hereinabove.

It will be recalled that the master code 82, which initiated the series of operations above described, called for a problem of multiplication in which the multiplicand of the problem was obtained from the F1 register 1136 and transferred to the multiplying relays 1301 of the calculator and the multiplying relays 1301 were operated in accordance with the value of the multiplicand registered in the F1 register 1136. Master code 82 on the master control tape also established that the multiplier in the multiplication problem was to be obtained from the range information recorded in the interpolator data tape at time block T-1. Therefore, each digit of the range information will be utilized as a multiplier digit. When Y relay 918 operated, it connected the translator relays 711 through 715 to the R multiple 914 so that the reading of the first digit of the range information by the interpolator transmitter which causes the operation of the translator relays 711 through 715 will be extended through front contacts and armatures of Y relays 918 over the R multiple 914 to operate multiplier relays 1302. As described in detail in the said Andrews-Vibbard application, the multiplication of the multiplicand obtained from the F1 register by the first digit of the range information obtained from the interpolator data tape will be carried out. When the calculator has accepted the first digit of the multiplier, a ground will be applied to the TA lead 1315 by the multiplying steering circuit 1304 and this lead extends through the winding of TA relay 853 to battery. TA relay 853 in operating, will complete a circuit for the operation of ADV relay 826. ADV relay 826 in operating, releases the operated ones of translator relays 711 through 715 which in turn recloses the down-check circuit for the operation of GD relay 824. GD relay 824 in operating, operates GD-1 relay 825. After the calculator has performed the multiplication, utilizing the first digit of the range information as the multiplier, the multiplying steering circuit will remove the ground from TA lead 1315 which will release TA relay 853. When TA relay 853 releases ADV relay 826 will be released. A circuit is now completed for the operation of TMC relay 834 as described hereinbefore which operates and closes a circuit for the operation of stop magnet 703. Stop magnet 703 operates and in the manner described hereinbefore, the interpolator data tape is advanced to the code position of the second digit of the range information. During the movement of the tape to the second digit of the range information, auxiliary contacts 705 are opened which permits TMC-1 relay 833 to operate and in turn open a circuit for stop magnet 703. As described hereinbefore, the universal contact 708 operates for a short interval and the translator relays 711 through 715 are operated in code in response to the reading of the second digit of the range information and are lock operated through the back contact and armature 2 of ADV relay 826. The second digit of the range information is transmitted over cable 718 through front contacts of Y relay 918, over the R multiple 914 to the multiplier relays 1302 where, as described in detail in the said Andrews-Vibbard application, the multiplication of the multiplicand by the second digit of the multiplier is carried out and the product is summed with the product of the multiplicand and the first digit of the multiplier. When the second digit of the multiplier is received over the R multiple from the interpolator control circuit, ground will again be applied to TA lead 1315 which will again operate TA relay 853. The operation of TA relay 853 will again operate ADV relay 826 which will cause the interpolator data tape to be stepped to the third digit of the range information.

Thereafter, the step by step advance of the interpolator tape is caused by the repeated operation of ADV relay 826 in response to the operation of TA relay 853. The interpolator tape will be stepped a step at a time from code position to code position of the range information recorded in the interpolator tape and this information will be transmitted over the R multiple to the multiplier relays 1302. This action continues until the interpolator transmitter recognizes a one-hole code which is a synchronizing character for the end of the range information as well as an identifying character for another set of data represented by azimuth. All of the one-hole code leads of cable 718 from the translator relays 711 through 715 are connected together through armatures and front contacts of Y relay 918 to lead 925 which extends to the winding of OHC relay 900. Therefore, after the interpolator data transmitter has read all of the range information, it will read the one-hole AZ code which will cause a ground to be applied through armature 7 and front contact of Y relay 918 to conductor 925. This ground on conductor 925 will cause the operation of OHC relay 900. OHC relay 900 operates and locks operated in a circuit from ground, armature 6 and front contact of STC relay 805, armature 2 and front contact of OHC relay 900, through the winding of OHC relay 900 to battery. OHC relay 900 in operating, also extends the ground in armature 2 and front contact of OHC relay 900 through auxiliary front contact of OHC relay 900 over OHC lead 1316 to the multiplying steering circuit 1304. This signals the calculator that the last digit of the multiplier has been transmitted over the R multiple and that there are no further multiplier digits. After completion of the multiplication of the multiplicand by the last digit of the multiplier received from the interpolator data tape, the calculator closes an up-check circuit which places a ground on step lead 623 which in turn causes the operation of STP relay 420 in the master control circuit and causes the master control tape to be advanced to the next code position. This will release the function control relays 1303 and the multiplying steering circuit 1304 and in turn will release the relays of the interpolator control circuit.

The manner in which the interpolator control circuit causes a recycle of the master control transmitter which in turn causes the master tape to be returned to its starting point and the advance of the problem data tape to the next time block number in the event that required data is missing from the interpolator data tape will now be described. Assume that during the course of the problem in multiplication above described that the range information required for the multiplier digits in the multiplying problem was not available. Therefore, when the interpolator data tape was prepared, a Z recycle code followed by two ID codes will be perforated in the tape in place of the range information. When the interpolator tape is stepped, as described above, so that the Z recycle code is read by the interpolator data transmitter, the operation of the translator relays 711 through 715 in response to the reading of this Z recycle code will cause a ground to be applied to the 00 or 5 leads in cable 718 which, as described above, extend through front contacts 1 and 2 of X relay 911 to the BP lead. This ground on the lead BP is in turn extended by lead 922 through the winding of LTS-1 relay 823 to battery. The operation of LTS-1 relay 823 causes the interpolator data tape to be stepped to the next code position as described hereinbefore. When the interpolator transmitter reads the one-hole ID code the translator relay 712 will operate and will place a ground on the ID lead of cable 718 which is extended through front contact and armature 6 of X relay 917, conductor 924, to lead 601 and thence through the winding of RC relay 600 in the master control circuit. The operation of RC relay 600 will, as described hereinbefore, cause the recycle of the master control circuit and the return of the master control tape to its starting point and the advance of the problem data tape to the next time block number. Thus, when the required data is missing from the interpolator data tape the perforation of the Z recycle code and the one-hole ID codes will cause the master control circuit to recycle and the problem data tape to advance to the next time block number.

It is believed that further detailed description of the circuits herein is unnecessary as enough has now been given to give a clear understanding of the interplay of the controls between the master control circuit and the calculator and the other control circuits of which the problem data and the interpolator control circuits are shown in some detail and others, such as the ballistic data control, the printer control and the register circuits are indicated. Enough have been recited to give a clear understanding of the present calculating device, primarily controlled by a plurality of tapes in transmitters having mutually controlling circuits. It has been shown that the master or routine tape is placed in a transmitter which may move the tape either forwardly or backwardly and may be in the form of an endless loop. The master tape contains a complete set of orders to calculate one function or set of functions corresponding to one argument or set of arguments and will consequently be used over its entire length as the argument tape in the problem data transmitter is moving over a single block. The problem data transmitter is of a simpler type being arranged for simple straightforward step-by-step movement. The other transmitters are similar to the master tape transmitters since information in their tapes must first be located before being used. Generally speaking, the master or routine tape issues a series of orders to be carried out by other various parts of the calculating device. The satisfactory completion of each operation is signalized by a satisfaction signal which takes the form of a grounding of the step conductor 623 over any one of its numerous branches, whereupon the master circuit proceeds to issue a new order.

It may be noted, without detailed explanation here, that the number of courses or problems which may be recorded in the problem data and interpolator tapes is unlimited. Each course or problem is followed by the 999 symbol which when read off the interpolator tape will cause a major recycle operation, that is, one in which no further calculations will be made in the problem on which the device has been working but in which the data for an entirely new problem will be used. When the end of the tape in either the problem data transmitter or the interpolator transmitter is reached the 00 symbol (last two codes in the tape in Fig. 12) will be encountered. This will completely stop any further operations of the device.

What is claimed is:

1. In a calculator, problem data indices each having problem data indexed therein in groups of indicia, each said group being identified by a group indicium, said group indicia being arranged in a regular succession and each said problem data index having corresponding successions of identical group indicia, a first problem data transmitter circuit arranged to respond successively to the indicia of a first problem data index for translating said indicia into electrical characterizations, a calculator, means in said calculator responsive to electrical characterizations representing said problem data within one of said groups for calculating a value, an interpolator transmitter circuit arranged to selectively move a second problem data index under control of said calculator to a group indicium indicated by said calculated value, and means in said interpolator transmitter circuit responsive to electrical characterizations produced and transmitted by the interpolator transmitter from indicia recorded in said second problem data index denoting the lack of problem data indicia within said group indicated by said calculated value to cause said first problem data transmitter circuit to advance said first problem data index to another of said group indicia.

2. In a calculator, problem data indices each having problem data indexed therein in groups of indicia, each said group being identified by a group indicium, said group indicia being arranged in a regular succession and each said problem data index having corresponding successions of identical group indicia, a first problem data transmitter circuit arranged to respond successively to the indicia of a first problem data index, a second problem data transmitter circuit arranged to selectively move a second problem data index to a particular group indicium and to thereafter respond successively to the problem data indicia in said group and means responsive to electrical signals produced and transmitted thereto by said second problem data transmitter from indicia recorded in said second problem data index denoting the lack of problem data indicia within said particular group to cause said first problem data transmitter circuit to advance said first problem data index to another of said group indicia.

3. In a calculator, the combination of a routine tape, a routine tape transmitter, a routine control circuit responsive to electrical signals produced and transmitted thereto by said routine tape transmitter from orders recorded in said routine tape, a plurality of problem data tapes each having problem data recorded therein in corresponding blocks, a calculator responsive to said electrical signals representing orders recorded in said routine tape for each block of problem data in said problem data tapes, a controlling problem data transmitter, a controlled problem data transmitter and means in said routine control circuit responsive to electrical signals produced and transmitted thereto by said controlled problem data transmitter from special data recorded in the place of problem data in one of said blocks in one of said problem data tapes for recycling said calculator whereby said routine tape is driven to a starting point and the said problem data tape in said controlling transmitter is driven to the next succeeding block of problem data.

4. In a calculator, the combination of a routine tape having operational orders recorded therein, a routine tape transmitter, a routine control circuit responsive to electrical characterizations produced and transmitted thereto by said routine tape transmitter from said operational orders recorded in said routine tape, a plurality of problem data tapes each having problem data recorded therein, said data being divided into group with a group identification preceding each said group also recorded therein, a primary problem data transmitter and a plurality of dependent problem data transmitters each arranged to transmit electrical characterizations representing problem data from one of said problem data tapes, a plurality of registers responsive to electrical characterizations representing problem data transmitted thereto from said primary problem data transmitter, a calculator controlled in its pattern of operation by electrical characterizations representing said operational orders transmitted thereto by said routine tape transmitter to perform mathematical operations utilizing problem data transmitted thereto from said dependent problem data transmitters and said registers, means in said primary problem data transmitter controlled by said routine control circuit for driving the problem data tape in said primary problem data transmitter in a forward step by step manner through said primary problem data transmitter to sequentially transmit electrical characterizations representing problem data to said registers, means controlled by said routine control circuit for transmitting electrical characterizations representing problem data from said registers to said calculator, means in said dependent problem data transmitters controlled by said routine control circuit for driving the problem data tapes in said dependent problem data transmitters selectively forward or backward through respective said dependent problem data transmitters to selectively identified groups of problem data to sequentially transmit electrical characterizations representing said problem data to said calculator, recycle means in said routine control circuit for actuating said routine tape transmitter to drive said routine tape to a starting point and means in said primary problem data transmitter controlled by said recycle means for actuating said primary problem data transmitter to drive said problem data tape in said primary problem data transmitter to the next succeeding group identification, said recycle means being responsive to electrical characterizations produced and transmitted by said dependent problem data transmitters from recycle data recorded in said problem data tapes in lieu of problem data sought by said dependent problem data transmitters but not recorded in said problem data tapes.

5. In a calculator, the combination of a routine tape, a routine tape transmitter, a routine control circuit responsive to electrical signals produced and transmitted thereto by said routine tape transmitter from orders recorded in said routine tape, said routine tape being arranged to control the calculating operations for one cycle of operation and being in the form of an endless loop containing the record of one or more complete cycles of operation, a plurality of problem data tapes each having data recorded therein in corresponding blocks, each block of data in a controlling one of said problem data tapes being complete for one cycle of calculating operations, a controlling problem data transmitter for transmitting electrical signals representing problem data from said controlling one of said problem data tapes, other transmitters for transmitting electrical signals representing problem data from the remainder of said problem data tapes, recycle codes recorded in said problem data tapes in positions before any recorded problem data, after any recorded problem data and within any of said blocks when problem data has not been provided or is incomplete, recycle means in said routine control circuit responsive to the transmission of a recycle signal by any one of said problem data transmitters for actuating said routine tape transmitter to drive said routine tape to the start of a cycle and means in said controlling problem data transmitter controlled by said recycle means for actuating said controlling problem data transmitter to drive said controlling problem data tape to the next succeeding block.

6. In a calculator, the combination of a plurality of problem data tapes in a corresponding plurality of tape transmitters, one of said transmitters being a dominant transmitter and the others of said transmitters being subservient transmitters, a control circuit for controlling said transmitters, means in said control circuit responsive to electrical characterizations produced and transmitted thereto by one of said subservient transmitters from special data recorded in the absence of particular problem data in one of said problem data tapes in said one of said subservient transmitters for controlling said dominant transmitter to abandon transmission of problem data and to advance the problem data tape in said dominant transmitter to another position.

7. In a calculator, the combination of a master tape, a master tape transmitter, a master control circuit responsive to electrical signals produced and transmitted thereto by said master tape transmitter from orders recorded in said master tape, a plurality of problem data tapes, a dominant problem data tape transmitter for transmitting electrical signals representing problem data from one of said problem data tapes, a subservient problem data tape transmitter for transmitting electrical signals representing problem data from a second of said problem data tapes, said problem data tapes having problem data recorded therein in corresponding groups and means in said master control circuit responsive to electrical signals produced and transmitted thereto by said subservient problem data transmitter from special data recorded in the absence of problem data in a hunted group in said second problem data tape in said subservient transmitter for causing the advance of said problem data tape in said dominant transmitter to another group of problem data.

8. In a calculator, the combination of a routine tape having operational orders recorded therein, a routine tape transmitter, a routine control circuit responsive to electrical signals produced and transmitted thereto by said routine tape transmitter from said operational orders recorded in said routine tape, a plurality of problem data tapes each having problem data recorded therein, said data being divided into groups with a group identification preceding each group also recorded therein, a primary problem data transmitter and a plurality of dependent problem data transmitters each arranged to transmit electrical signals representing problem data from one of said problem data tapes, a calculator controlled in its pattern of operation by electrical signals representing said operational orders transmitted thereto by said routine tape transmitter and in its mathematical operations by electrical signals representing said problem data transmitted thereto by said primary and said dependent problem data transmitters, means controlled by said routine control circuit for driving the problem data tape in said primary problem data transmitter in a forward step-by-step manner through said primary problem data transmitter to sequentially transmit electrical signals representing items of problem data to said calculator, means controlled by said routine control circuit for driving the problem data tapes in said dependent problem data transmitters selectively forward or backward through respective said dependent problem data transmitters to selectively identified groups of problem data to sequentially transmit electrical signals representing items of problem data to said calculator, recycle means in said routine control circuit for actuating said routine tape transmitter to drive said routine tape to a starting point and means in said primary problem data transmitter controlled by said recycle means for actuating said primary problem data transmitter to drive said problem data tape in said primary problem data transmitter to the next succeeding group identification.

9. In a calculator, the combination of a routine tape having operational orders recorded therein, a routine tape transmitter, a routine control circuit responsive to electrical signals produced and transmitted thereto by said routine tape transmitter from said operational orders recorded in said routine tape, a plurality of problem data tapes each having problem data recorded therein, said data being divided into groups with a group identification preceding each said group also recorded therein, a primary problem data transmitter and a plurality of dependent problem data transmitters each arranged to transmit electrical signals representing problem data from one of said problem data tapes, a calculator controlled in its pattern of operation by electrical signals representing said operational orders transmitted thereto by said routine tape transmitter and in its mathematical operations by electrical signals representing said problem data transmitted thereto by said primary and said dependent problem data transmitters, means controlled by said routine control circuit for driving the problem data tape in said primary problem data transmitter in a forward step-by-step manner through said primary problem data transmitter to sequentially transmit electrical signals representing items of problem data to said calculator, means controlled by said routine control circuit for driving the problem data tapes in said dependent problem data transmitters selectively forward or backward through respective said dependent problem data transmitters to selectively identified groups of problem data to sequentially transmit electrical signals representing items of problem data to said calculator, a circuit for each of said problem data transmitters and means in each of said circuits for signaling said routine control circuit upon the satisfactory completion of an operation ordered by said routine control circuit whereby said routine control circuit actuates said routine tape transmitter to advance said routine tape to the next operational order recorded in said routine tape.

References Cited in the file of this patent

UNITED STATES PATENTS

| Number | Name | Date |
|---|---|---|
| 1,694,009 | Goldberg | Dec. 4, 1928 |
| 1,761,662 | Goldberg | June 3, 1930 |
| 1,874,184 | Goldberg | Aug. 30, 1932 |
| 2,098,248 | Keefe | Nov. 9, 1937 |

FOREIGN PATENTS

| Number | Country | Date |
|---|---|---|
| 385,130 | Italy | Feb. 13, 1941 |
| 600,896 | Great Britain | Apr. 21, 1948 |

OTHER REFERENCES

Babbage's Calculating Engines, by E. and F. N. Spon, published 1889; pages 10-82 and 159-179 plus 15 sheets of drawings at the end of the book and a photograph of the calculating machine.